(12) United States Patent  
Choudhry et al.

(10) Patent No.: US 8,189,685 B1  
(45) Date of Patent: *May 29, 2012

(54) RANKING VIDEO ARTICLES

(75) Inventors: Shahid Choudhry, London (GB); John Piscitello, San Francisco, CA (US); Christopher Richard Uhlik, Danville, CA (US); Monika Hildegard Henzinger, Attalens (CH); Matthew Vosburgh, Sunnyvale, CA (US); Aaron Lee, Mountain View, CA (US); David Marwood, Foster City, CA (US); Peter Chane, Palo Alto, CA (US); Steve Okamoto, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/077,519

(22) Filed: Mar. 31, 2011

Related U.S. Application Data

(63) Continuation of application No. 11/271,362, filed on Nov. 10, 2005, now Pat. No. 7,933,338.

(60) Provisional application No. 60/626,461, filed on Nov. 10, 2004, provisional application No. 60/626,585, filed on Nov. 10, 2004, provisional application No. 60/626,481, filed on Nov. 10, 2004, provisional application No. 60/626,528, filed on Nov. 10, 2004, provisional application No. 60/626,610, filed on Nov. 10, 2004.

(51) Int. Cl.  
*H04B 1/66* (2006.01)  
*G06K 9/36* (2006.01)

(52) U.S. Cl. .................................. 375/240.26; 382/233

(58) Field of Classification Search .................. 382/100, 382/103, 106, 107, 112, 113, 155, 168, 171, 382/180, 181, 189–195, 209, 232, 260, 274, 382/291, 305, 312, 235, 233; 375/240.26; 1/1; 715/720, 256; 455/432.3  
See application file for complete search history.

(56) References Cited

U.S. PATENT DOCUMENTS 5,485,611 A    1/1996   Astle  
(Continued)

FOREIGN PATENT DOCUMENTS

AT    0252296 E    10/2003  
(Continued)

OTHER PUBLICATIONS

"1TB + 7 TV Tuners = Type X", TechJapan.com, 2 pages [online] May 10, 2004 [Retrieved on May 11, 2004] Retrieved from the Internet: <URL: http://www.techjapan.com/modules.php?op=modload&name=News&file=article&sid=277>.

(Continued)

*Primary Examiner* — Seyed Azarian  
(74) *Attorney, Agent, or Firm* — Fenwick & West LLP

(57) ABSTRACT

An information retrieval system is provided for processing queries for video content. A server receives a query for video content and returns video articles, as received from broadcast systems or other content providers. Queries are formulated using text, video images, and/or visual content associated with a video article. Various video-oriented characteristics associated with the results of the queries are determined and a rank score is calculated for each. The ranked video articles are displayed in a representation to the user, from which the user can play the video article either within the representation or independent of it.

21 Claims, 20 Drawing Sheets

U.S. PATENT DOCUMENTS

| | | | |
|---|---|---|---|
| 5,493,677 A * | 2/1996 | Balogh et al. ............... 382/305 |
| 5,664,227 A | 9/1997 | Mauldin et al. |
| 5,687,331 A | 11/1997 | Volk et al. |
| 5,689,591 A | 11/1997 | Balram et al. |
| 5,748,954 A | 5/1998 | Mauldin |
| 5,819,286 A | 10/1998 | Yang et al. |
| 5,835,667 A | 11/1998 | Wactlar et al. |
| 5,854,856 A | 12/1998 | Moura et al. |
| 5,893,110 A | 4/1999 | Weber et al. |
| 6,173,287 B1 | 1/2001 | Eberman et al. |
| 6,182,069 B1 * | 1/2001 | Niblack et al. ............... 1/1 |
| 6,285,999 B1 | 9/2001 | Page |
| 6,374,260 B1 | 4/2002 | Hoffert et al. |
| 6,564,225 B1 | 5/2003 | Brogliatti et al. |
| 6,578,048 B1 | 6/2003 | Mauldin |
| 6,581,070 B1 | 6/2003 | Gibbon et al. |
| 6,757,866 B1 * | 6/2004 | Dey et al. ............... 715/256 |
| 6,816,858 B1 | 11/2004 | Coden et al. |
| 6,859,799 B1 | 2/2005 | Yuen |
| 6,907,570 B2 * | 6/2005 | Amir et al. ............... 715/720 |
| 7,437,353 B2 * | 10/2008 | Marmaros et al. ............ 1/1 |
| 7,540,011 B2 | 5/2009 | Wixson et al. |
| 7,620,624 B2 | 11/2009 | Stata et al. |
| 7,660,581 B2 * | 2/2010 | Ramer et al. ............. 455/432.3 |
| 7,954,056 B2 | 5/2011 | Graham |
| 2001/0056434 A1 | 12/2001 | Kaplan et al. |
| 2002/0023101 A1 | 2/2002 | Kurihara et al. |
| 2002/0069218 A1 | 6/2002 | Sull et al. |
| 2002/0107850 A1 | 8/2002 | Sugimoto et al. |
| 2002/0152267 A1 | 10/2002 | Lennon |
| 2002/0168117 A1 | 11/2002 | Lee et al. |
| 2003/0031248 A1 | 2/2003 | Yurt et al. |
| 2003/0031249 A1 | 2/2003 | Yurt et al. |
| 2003/0031250 A1 | 2/2003 | Yurt et al. |
| 2003/0038832 A1 | 2/2003 | Sobol |
| 2003/0043902 A1 | 3/2003 | Yurt et al. |
| 2003/0043903 A1 | 3/2003 | Yurt et al. |
| 2003/0048841 A1 | 3/2003 | Yurt et al. |
| 2003/0118095 A1 | 6/2003 | Yurt et al. |
| 2003/0121049 A1 | 6/2003 | Yurt et al. |
| 2003/0167264 A1 | 9/2003 | Ogura et al. |
| 2003/0194006 A1 | 10/2003 | Yurt et al. |
| 2003/0200225 A1 | 10/2003 | Yurt et al. |
| 2003/0206598 A1 | 11/2003 | Yurt et al. |
| 2003/0206599 A1 | 11/2003 | Yurt et al. |
| 2003/0208770 A1 | 11/2003 | Yurt et al. |
| 2003/0208774 A1 | 11/2003 | Yurt et al. |
| 2004/0049541 A1 | 3/2004 | Swahn |
| 2004/0049792 A1 | 3/2004 | Yurt et al. |
| 2004/0098671 A1 | 5/2004 | Graham et al. |
| 2004/0120857 A1 | 6/2004 | Smith et al. |
| 2004/0189691 A1 | 9/2004 | Jojic et al. |
| 2004/0199502 A1 | 10/2004 | Wong et al. |
| 2004/0210567 A1 | 10/2004 | Bourdoncle |
| 2004/0267774 A1 | 12/2004 | Lin et al. |
| 2005/0050022 A1 | 3/2005 | Dukes et al. |
| 2005/0114325 A1 | 5/2005 | Liu et al. |
| 2005/0128318 A1 | 6/2005 | Leow et al. |
| 2005/0246373 A1 | 11/2005 | Faulkner et al. |
| 2006/0271594 A1 | 11/2006 | Haberman |
| 2010/0146447 A1 | 6/2010 | Ubillos et al. |

FOREIGN PATENT DOCUMENTS

| | | | |
|---|---|---|---|
| DK | 0933892 | T3 | 2/2004 |
| EP | 1330126 | A2 | 7/2003 |
| EP | 1335601 | A2 | 8/2003 |
| EP | 1335602 | A2 | 8/2003 |
| EP | 1339236 | A2 | 8/2003 |
| EP | 0933892 | B1 | 10/2003 |
| EP | 1330126 | A3 | 10/2003 |
| EP | 1335601 | A3 | 10/2003 |
| EP | 1335602 | A3 | 10/2003 |
| EP | 1339236 | A3 | 10/2003 |
| EP | 1359759 | A1 | 11/2003 |
| EP | 1359760 | A1 | 11/2003 |
| EP | 1367828 | A1 | 12/2003 |

OTHER PUBLICATIONS

7747—Using the Noldus Observer, 2 pages [online] [Retrieved on Feb. 17, 2006] Retrieved from the Internet<URL://www.brookes.ac.uk/schools/social/psych/obswinvc.html!>.

Akimbo, What is Akimbo? 2 pages [online] [Retrieved on Feb. 22, 2006] Retrieved from the Internet<URL:http://www.akimbo.com/whatis.html>.

Bakeman, R. et al., OTS: A Program for Converting Noldus Observer Data Files to SDIS Files, Behavior Research Methods, Instruments, and Computers, Mar. 8, 1999, revised Sep. 17, 1999, 19 pages.

Bakeman, R. et al., OTS: A Program for Converting Noldus Observer Data Files to SDIS Files, Feb. 2000, 32(1): 207-12, abstract.

Carnegie Mellon University, Welcome to the Informedia Project!,1994-2006, 1 page [online] [Retrieved on Feb. 17, 2006] Retrieved from the Internet<URL:http://www.informedia.cs.cmu.edu/>.

Centre for Digital Video Processing, 2006, 2 pages [online] [Retrieved on Feb. 17, 2006] Retrieved from the Internet<URL:http://www.cdvp.dcu.ie/.

"Centre for Digital Video Processing, Dublin City University, Ireland", 1 page [online] 2004 [Retrieved on Jul. 29, 2004] Retrieved from the Internet: <URL: http://www.cdvp.dcu.ie/>.

"Centre for Digital Video Processing, Dublin City University, Ireland, Publications by All Authors", 21 pages [online] 2004 [Retrieved on Jul. 29, 2004] Retrieved from the Internet: <URL: http://www.cdvp.dcu.ie/publications.html>.

Chan, Ching Hau et al., "Affect-Based Indexing and Retrieval of Films," MM '05, ACM, Nov. 6-11, 2005, pp. 427-430.

Chen, Jau-Yuen et al., "ViBE: A Compressed Video Database Structured for Active Browsing and Search", Purdue University, West Lafayette, IN., 31 pages.

Christel, Michael G. et al., "Enhanced Access to Digital Video Through Visually Rich Interfaces", Proceedings of the IEEE International Conference on Multimedia and Expo (ICME), Jul. 6-9, 2003, Baltimore, MD, 4 pages.

Derthik, Mark et al., "A Cityscape Visualization of Video Perspectives", Proceedings of the National Academy of Sciences Arthur M. Sackler Colloquium on Mapping Knowledge Domains (unpublished), May 2003, Irvine, CA, 2 pages.

Dublin City University, 2004, 1 page [online] [Retrieved on Feb. 17, 2006] Retrieved from the Internet<URL:http://www.acemedia.org/aceMedia/partners/details/DCU.html>.

Dufour, C. et al., "Exploring User Interaction with Digital Videos," Department of Computer Science, Knowledge Media Design Institute, University of Toronto, 2 pages.

Duygulu, Pinar et al., "Associating Video Frames with Text", 26$^{th}$ Annual International ACM SIGIR Conference, Jul. 28-Aug. 1, 2003, Toronto, Canada, 8 pages.

Fischlar Video Browsers, 6 pages [online] [Retrieved on Feb. 17, 2006] Retrieved from the Internet<URL:http://www.computing.dcu.ie/~hlee/FischlarUldescription/FischlarFamily2.html>.

Flickner, Myron et al., "Query by Image and Video Content: The QBIC System", (abstract) Computer, vol. 28, Issue 9, Sep. 1995, 19 pages.

Gurrin, C. et al., "Fischlár @ TRECVID2003: System Description," MM '04, ACM, Oct. 10-16, 2004, pp. 938-939.

Haberman et al., U.S. Appl. No. 60/560,146, filed Apr. 7, 2004.

Huseby, Sverre H., "Transferring Video on the Internet: Summary", Video on the World Wide Web: Accessing Video from WWW Browsers, University of Oslo, Department of Informatics, 3 pages [online] Feb. 2, 1997 [Retrieved on May 4, 2004] Retrieved from the Internet: <URL: http://www.ifi.uio.no/~ftp/publications/cand-scient-theses/SHuseby/html/node15.html>.

IBM Customer Reference Videos, 4 pages [online] [Retrieved on Feb. 17, 2006] Retrieved from the Inernet<URL:http://www-306.ibm.com/software/tivoli/successstories/videos/bp-index.html>.

IDEA Lab Home, Department of Information Systems, The University of Melbourne, 2005, 7 pages. [online] [Retrieved on Feb. 17, 2006] Retrieved from the Internet<URL:http://idealab.dis.unimelb.edu.au/>.

"Informedia Publications", The Informedia Project, Automated Digital Video Understanding Research at Carnegie Mellon, 19 pages,

[online] Jun. 10, 2004 [Retrieved on Jul. 29, 2004] Retrieved from the Internet: <URL: http://www.informedia.cs.cmu.edu/pubs/byyear.asp>.

International Organisation for Standardisation, Press Release: Highly Successful Evaluation Promises Bright Future for New Multimedia Description Standard MPEG-7, 5 pages [online] [Retrieved on Feb. 17, 2006] Retrieved from the Internet <URL: http://www.chiariglione.org/mpeg/meetings/seoul/seoul_press.html>.

Jiang, H. et al, "VideoText Database Systems" (abstract), Proceedings of the 1997 International Conference on Multimedia Computing and Systems (ICMCS'97), 1997, p. 344.

Kanellos, M., "IBM's 'Marvel' to Scour Net for Video, Audio," Sep. 29, 2004, CNET News.com, 3 pages.

Kazantzidis, Manthos, "How to Measure Available Bandwidth on the Internet" (Technical Report #010032), UCLA Computer Science Wireless Adaptive Mobility Lab, Los Angeles, CA, 6 pages.

Kipp, M., Anvil: The Video Annotation Research Tool, Download Documentation Support, 2 pages [online] [Retrieved on Feb. 22, 2006] Retrieved from the Internet<URL:http://www.dfki.de/~kipp/anvil/documentation.html>.

[MediaBot] IBM Video Annex—Movie Archives, 1 page [online] [Retrieved on Feb. 17, 2006] Retrieved from the Internet<URL:http://mia.ece.uic.edu/~papers/MediaBot/msg00004.html>.

Media Tagger, 2 pages [online] [Retrieved on Feb. 17, 2006] Retrieved from the Internet<URL:http://www.volny.cz/media-tagger/eng/>.

Media Tagger 1.3.0 Description, FreeFunFiles.com, 2003-2006, 2 pages [online] [Retrieved on Feb. 17, 2006] Retrieved from the Internet<URL:http://www.freefunfiles.com/software/audiovideo/musiceditors/media-tagger-1.3.0.html>.

Media Tagger, GIDForums, vBulletin, 2000-2006, 2 pages [online] [Retrieved on Feb. 17, 2006] Retrieved from the Internet<URL:http://www.gidforums.com/t-8182.html>.

Media Tagger, My Zips, Myzips.com, 1999-2006, 2 pages [online] [Retrieved on Feb. 17, 2006] Retrieved from the Internet<URL:http://www.myzips.com/software/Media-Tagger.phtml>.

Media Tagger, Snap Files, 1997-2005, 2 pages [online] [Retrieved on Feb. 17, 2006] Retrieved from the Internet<URL:http://www.snapfiles.com/get/mediatagger.html>.

Meghini, C., et al., "A Model of Multimedia Information Retrieval," Journal of the ACM, Sep. 2001, p. 909-970, vol. 48, Issue 5.

Naphade, Milind R. et al., "Learning to Annotate Video Databases", Pervasive Media Management Group, IBM T J Watson Research Center, Hawthorne, NY, 12 pages.

Natural Interactivity Tools Engineering (NITE) Annual Report, 2001, 5 pages [online] [Retrieved on Feb. 17, 2006] Retrieved from the Internet <URL:nite.nis.sdu.dk>.

ODLog™ Product Info, Macropod Software™, 2004, 2 pages [online] [Retrieved on Feb. 17, 2006] Retrieved from the Internet<URL:http://www.macropodsoftware.com/odlog/>.

PCNX Computing Technology News, PC Annex Inc., 2003-2006, 5 pages [online] [Retrieved on Feb. 17, 2006] Retrieved from the Internet<URL:http://www.pcnx.com/>.

"Pictron Video Gateway, Pictron, Powering Searchable Media", Pictron.com, 4 pages [online] [Retrieved on May 12, 2004] Retrieved from the Internet: <URL: http://www.pictron.com/products_vg.html>.

Rogers, D. et al., "The TV-Trawler Project," DSTC Pty. Ltd., University of Queensland, 10 pages.

Science Dynamics Corporation, Video Over Frame Relay: The VFX-250S, 2003, 3 pages [online] [Retrieved on Feb. 17, 2006] Retrieved from the Internet<URL:http://www.scidyn.com/products/vof.html>.

"Shadow tv monitoring," Shadow TV, Inc., 2003, 2 pages, can be retrieved at www.shadowtv.com.

Smeaton, A.F. et al., "The Fischlár Digital Video System: A Digital Library of Broadcast TV Programmes," JCDL '01, ACM, Jun. 24-28, 2001, pp. 312-313.

"Service Features" TiVo.com, 2 pages [online] [Retrieved on May 12, 2004] Retrieved from the Internet: <URL: http://www.tivo.com/1.6.4.asp>.

Sivic, Josef et al., "Video Google: A Text Retrieval Approach to Object Matching in Videos", Proceedings of the Ninth IEEE International Conference on Computer Vision (ICCV 2003), 2003, 9 pages.

The Observer® XT, Noldus Information Technology, 1 page [online] [Retrieved on Feb. 17, 2006] Retrieved from the Internet<URL:http://www.noldus.com/site/nav10000>.

The Observer, Noldus Information Technology, Inc., Aug. 2004, 2 pages [online] [Retrieved on Feb. 17, 2006] Retrieved from the Internet<URL:http://www.dtic.mil/matris/ddsm/srch/ddsm0168.html>.

"TiVo Service, There's Only One TiVo!", TiVo.com, 2 pages [online] [Retrieved on May 12, 2004] Retrieved from the Internet: <URL: http://www.tivo.com/1.2.asp>.

"TV Eyes—Technology", TV Eyes.com, 2002, 2 pages [online] [Retrieved on Jun. 18, 2004] Retrieved from the Internet: <URL: http://tveyes.com/technology.htm>.

Wactlar, Howard, D., "Informedia-II: Auto Summarization and Visualization of Multiple Video Documents from Distributed Sources", Informedia Digital Video Library, 8 pages [online] [Retrieved on May 12, 2004] Retrieved from the Internet: <URL: http://www.informedia.cs.cmu.edu/d1i2/talks/Inf2_IntroSlides/sId001.htm>.

Wactlar, Howard D. et al., "Informedia-II: Auto-Summarization and Visualization Over Multiple Video Documents and Libraries" (NSF Cooperative Agreement No. IIS-9817496, Semiannual Progress Report, Sep. 2001), Carnegie Mellon University, Pittsburgh, PA, 17 pages.

Wactlar, Howard D. et al., "Informedia-II Digital Video Library: Auto Summarization and Visualization Across Multiple Video Documents and Libraries", Informedia-Il Digital Video Library 2004, 4 pages [online] [Retrieved on May 11, 2004] Retrieved from the Internet: <URL: http://www.informedia.cs.cmu/d1i2/index.html>.

"Welcome to Informedia!", Informedia-Il Digital Video Library Jun. 10, 2004, 1 page [online] [Retrieved on Jul. 29, 2004] Retrieved from the Internet: <URL: http://www.informedia.cs.cmu.edu/>.

"WishList, All the TV You Love, All the Time", TiVo.com, 1 page [online] [Retrieved on May 12, 2004] Retrieved from the Internet: <URL: http://www.tivo.com/1.2.2.asp>.

Yahoo Video Search, 2006, 1 page [online] [Retrieved on Feb. 17, 2006] Retrieved from the Internet<URL:http://video.search.yahoo.com/>.

* cited by examiner

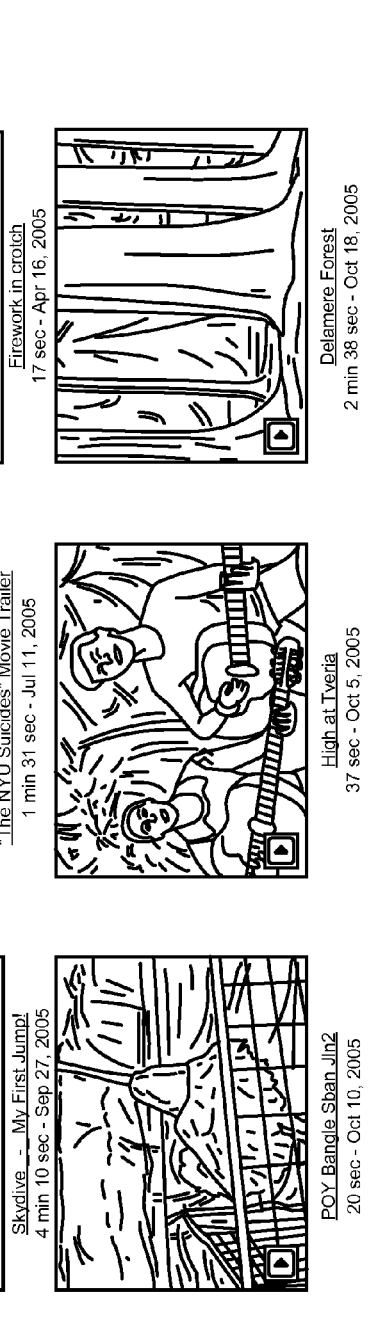

About Google Video | Google Video Help

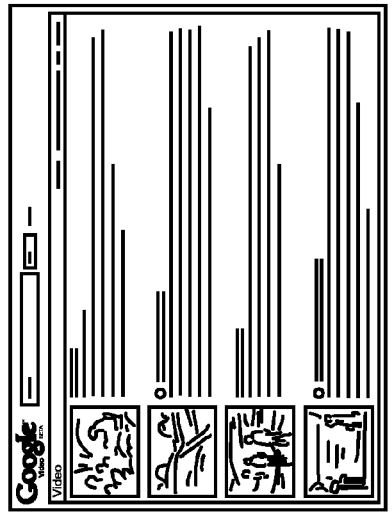

Enlarge image of results

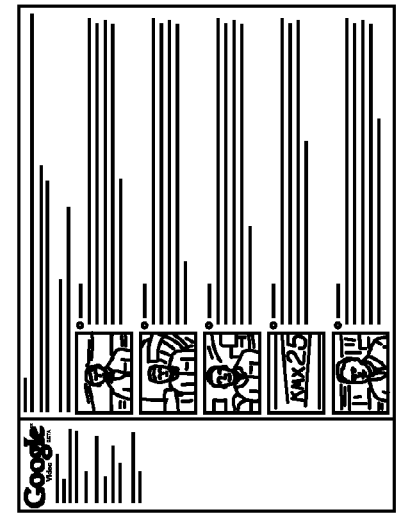

Enlarge image of preview

Google Video Help
Video BETA

825

I'm searching for a specific program. Why can't I find it?

Right now we're just testing Google Video, so only a small amount of programming from a limited number of channels is included in your search results. But we're indexing new content every day and we'll be adding channels in the near future, so you should see more and more results from your searches in the coming months. Most recently, we have increased our video library to include all types of video content uploaded from a variety of video publishers and allow you to play them back for free. See some samples of these videos.

What does the triangle icon next to the snippets mean in the search results?

The triangle icon means a video is available for playback for free.

Can I search by show title?

Yes, you can; just type 'title:' in front of the program name when you do a search. For example, title:nightline or add a keyword title:nightline music .

Can I search for a particular channel?

You can do that, too; just type "channel:" in front of the channel name when you do a search (make sure to use the station's common name). For example, channel:abc president bush restricts your search to ABC.

Can I play the videos that Google Video finds?

Some of the videos are only still images while others allow playback. Videos that offer playback will be labeled with a triangle play icon in the search result.

How do I playback video?

In order to playback video on Google Video, you simply need to have Macromedia Flash Player installed on your computer. Once installed, you will be able to playback the video from within your browser.

How can I find out when the show is next on TV in my area?

Google™ Video Upload Program
Video BETA

Help

Your work deserves to be seen.

You've made a great video. Now who will watch it?

Whether you produce hundreds of titles a year or just a few, you can give your videos the recognition and visibility they deserve by promoting them on Google - for free. Signing up for the Google Video Upload Program will connect your work with users who are most likely to want to view them.

Sign up and upload.

We're accepting digital video files of any length and size. Simply sign up for an account and upload your videos using our Video Uploader (please be sure you own the rights to the works you upload), and pending our approval process and the launch of this new service, we'll include your video in Google Video, where users will be able to search, preview, purchase and play it. Find out more here.

For major producers...

If you're from a TV station or production facility, we have a separate process to help you join the Google Video Upload Program. Find out more here.

Sign in to Google Video Upload Program with your
Google Account

Email: _____
Password: _____

☑ Remember me on this computer   [Sign in]

Forgot your password?

Common Questions
- What is the Google Video upload program?
- Can I add information to my video to help people find it?
- Do I retain the copyright and other legal rights to my videos?

View full FAQ

Getting starting is easy!

[Click Here to Apply]

©2005 Google - Google Video Home - Contact Us - Discuss - Privacy Policy

RANKING VIDEO ARTICLES

CROSS REFERENCE TO RELATED APPLICATIONS

This application is a continuation of U.S. application Ser. No. 11/271,362, filed on Nov. 10, 2005, entitled "Ranking Video Articles" which claims priority under 35 U.S.C. §119 from U.S. Provisional Application Ser. No. 60/626,461, filed on Nov. 10, 2004, entitled "Methods And Systems For Time-Context Indication In Video-Content Search Results;" U.S. Provisional Application Ser. No. 60/626,585, filed on Nov. 10, 2004, entitled "Methods And Systems For Ranking Search Results For Video Content;" U.S. Provisional Application Ser. No. 60/626,481, filed on Nov. 10, 2004, entitled "Methods And Systems For Visual Query Construction;" U.S. Provisional Application Ser. No. 60/626,528, filed on Nov. 10, 2004, entitled "Methods And Systems For Video Content Navigation;" and U.S. Provisional Application Ser. No. 60/626,610, filed on Nov. 10, 2004, entitled "Methods And Systems Formulating A Search Query Using Video Images," and is related to U.S. application Ser. No. 11/271,645, filed on Nov. 10, 2005, entitled "Querying for Video Content;" U.S. application Ser. No. 11/271,558, filed on Nov. 10, 2005, entitled "Forming a Video Search Query;" U.S. application Ser. No. 11/271,659, filed on Nov. 10, 2005, entitled "Displaying Representations of Video Articles;" U.S. application Ser. No. 11/271,280, filed on Nov. 10, 2005, entitled "Displaying Video Query Results;" and U.S. Pat. No. 6,285,999, each of which is incorporated herein by reference.

FIELD OF INVENTION

The present invention relates to information retrieval systems generally, and more particularly to systems and methods for querying for and navigating video content.

BACKGROUND OF INVENTION

Information retrieval systems, as exemplified by Internet search engines, are generally capable of quickly providing documents that are generally relevant to a user's query. Search engines may use a variety of statistical measures of term and document frequency, along with linkages between documents and between terms to determine the relevance of document to a query. Some conventional search applications provide search results for graphics and video files in a database associated with a network. However, conventional systems usually limit searches to the key words associated with each of the graphics or video files, such as the name of the file. Using a search query provided by a user, conventional search applications can perform a search for specific key words in the name of the file, and obtain a search result. However, these search applications do not provide any indications of where the search terms are located within the graphics or video files. In addition, these search applications can return unreliable search results since there is relatively little data to rank or score search results according to the content of the graphics or video files that are relevant or useful to the user for the search query and to locate search results according to content of the video files.

Conventional methods for navigating video content can allow a user to select a scene from a predetermined set of possible segments. Existing methods do not offer dynamic scene or segment selection however. For example, conventional systems and methods do not allow a user to select from a number of scenes or segments based on a current segment of a video.

SUMMARY OF THE INVENTION

The present invention describes an information retrieval system for processing queries for video content. A server receives a query for video content and returns video articles, as received from broadcast systems or other content providers. Queries are formulated using text, video images, and/or visual content associated with a video article. The resulting set of video articles is ranked and a representation of each video article is displayed to the user. The user can play the video article either within the representation or independent of it.

In one aspect the present invention comprises systems and methods for providing video content as a result of a search query. In another aspect the present invention provides systems and methods for ranking search results for video content. Another aspect of the present invention comprises systems and methods for formulating a search query using video images. In yet another aspect, the present invention comprises systems and methods for displaying a representation of a plurality of video article query results. In yet another aspect, the present invention comprises systems and methods for playing a video article resulting from a search query.

The present invention is next described with respect to various figures, diagrams, and technical information. The figures depict various embodiments of the present invention for purposes of illustration only. One skilled in the art will readily recognize from the following discussion that alternative embodiments of the illustrated and described structures, methods, and functions may be employed without departing from the principles of the invention.

BRIEF DESCRIPTION OF THE DRAWINGS

FIG. 7c is a random video page according to one embodiment of the present invention.

FIG. 8b is a video help screen according to one embodiment of the present invention.

FIG. 8c is a video upload screen according to one embodiment of the present invention.

FIGS. 9a-b are video results pages according to one embodiment of the present invention.

DETAILED DESCRIPTION

System Overview

Figure 1:
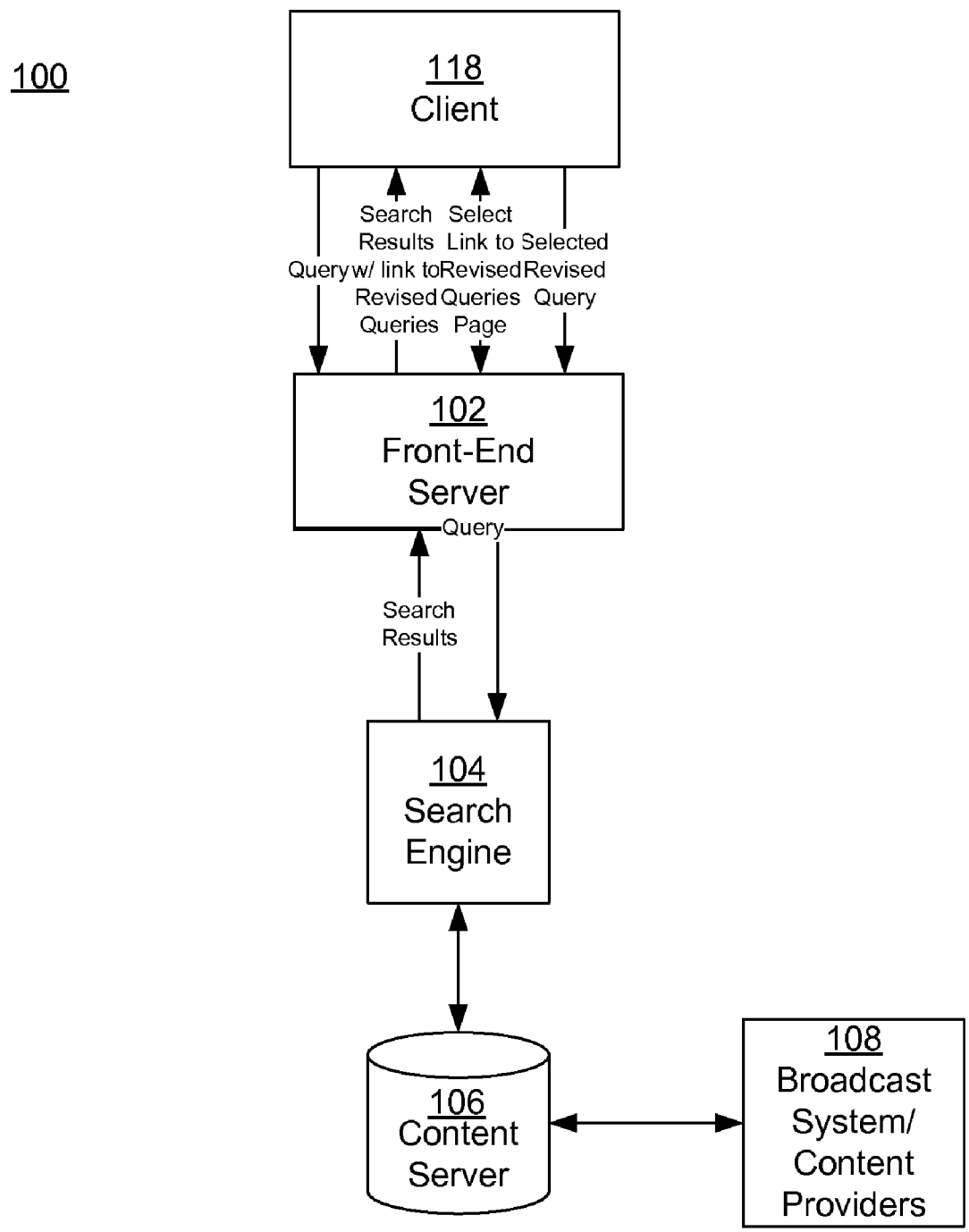
FIG. 1 illustrates a system in accordance with one embodiment of the present invention.

FIG. 1 illustrates a system 100 in accordance with one embodiment of the present invention. System 100 comprises a front-end server 102, a search engine 104, and an associated content server 106. In addition, one or more client devices 118 are in communication with the content server 106, e.g., over a network. In one implementation, the system 100 operates on high performance server class computers, and the client device 118 can be any type of computing device. The network may comprise the Internet in one embodiment. In other embodiments, other networks, wired and wireless, such as an intranet, local area network, wide area network, or broadcast network may be used. Moreover, methods according to the present invention may operate within a single client or server device.

The front-end server 102 in one embodiment comprises a processor and a computer-readable memory. The front-end server 102 is depicted in FIG. 1 as a single computer system, however, the system may be implemented as a network of computer processors. Examples of server devices are servers, mainframe computers, networked computers, a processor-based device, and similar types of systems and devices. The server processor can be any of a number of well known computer processors, such as processors from Intel Corporation of Santa Clara, Calif. and Motorola Corporation of Schaumburg, Ill.

The search engine 104 acts as a media-content-management application program, which is configured to manage media content, such as video content, audio content, images, documents, and presentations. The search engine 104 communicates with one or more content servers 106 to retrieve data that is relevant to user-entered search query.

Similar to the client 118 and the server 102, the content server 106 comprises a processor a memory. The content server 106 in one embodiment previously has received video content, processed the video content, indexed the video content, and stored the video content, for example in a content database on the server. In other embodiments, the video content may be stored external to the content server 106. Processed and stored video content is referred to herein as one or more video articles. A video article can be stored in various ways and formats. For example, a video article can be stored as a file or other data in a database or other storage medium. A video article can comprise, for example, video content of various formats, such as Moving Picture Experts Group (MPEG), Video for Windows (AVI), QuickTime, Indeo, Digital Television (DTV) or High Definition Television (HDTV), video content of various television standards, such as National Television Standards Committee (NTSC), Phase Alternating Line (PAL), Systèm Electronique pour Couleur avec Mémorie (SECAM), or any other suitable video content of any format and standard whatsoever broadcast and/or made available on a network (such as the Internet), a personal computer, or other computing or storage means, and data associated with the video content such as program guide information and closed captioning text. The embodiments described herein are described generally in relation to video content, but embodiments may operate on any suitable type of content, including audio content.

The client device 118 comprises a computer-readable medium and a memory, such as a random access memory (RAM). The client 118 can be any type of client computing device, for example, a device executing a browser application or other application adapted to communicate over Internet related protocols (e.g., TCP/IP and HTTP) and/or display a user interface. The details of the hardware aspects of server and client computers is well known to those of skill in the art and is not further described here. While only a single client 118 is shown, the system 100 can support a large number of concurrent sessions with many clients.

During operation, a user accesses the system 100 via a conventional client 118 over a network. The front-end server 102 receiving a search query, for example a query for video content, submitted by the client 118. The front-end server 102 provides the query to the search engine 104, which evaluates the query to retrieve a set of search results, for example video articles, in accordance with the search query, and returns the results to the front-end server 102. A content server 106 stores a large number of video articles and/or documents indexed (and/or retrieved) from different websites. Alternately, or in addition, the content server 106 stores an index of documents on various websites. "Documents" are understood here to be any form of indexable content, including textual documents in any text or graphics format, images, video, audio, multimedia, presentations, web pages (which can include embedded hyperlinks and other metadata, and/or programs, e.g., in Javascript), and so forth.

In one embodiment, relevant search results comprise one or more of the following: video article identifiers, indexes, thumbnail images, and/or text associated with video articles. The search results can be formatted as a list or grid with each individual search result having a video article identifier, a thumbnail image, an indicator, and/or text associated with the video article. The indicator, if any, provides an indication of the relative location or locations where one or more search terms from the search query are located within the video article. If the user clicks on one of the indicated relative locations, then a portion of the video article associated with that location is output to the client device 118 for display.

In one embodiment, the content server 106 receives video content from one or more broadcast systems and/or other content providers 108. For example, the content server 106 in one embodiment is in communication with one or more television broadcast systems, such as a satellite-television broadcast system, a cable-television broadcast system, a terrestrial-television broadcast system, or other video-based broadcast system. The content server 106 may also receive video content directly from content providers.

In one embodiment, the memory of the content server 106 is configured to receive video content from the broadcast system/content providers 108 and process the video content for storage. Alternatively, video content received may already have been processed. The processor of the content server 106 can further process video content, for example, by determining if the video content contains errors and/or determining if the video content is a duplicate. In addition, the content server 106 is configured to determine key terms and words associated with the video content that can be used to index the video content according to one embodiment. For example, program guide information can be used to determine terms or words appearing in the title of the video content, the actors or people appearing in the video content, a summary of the subject matter and other general information associated with the video content. In one embodiment, terms or words appearing in the audio associated with the video content is identified using associated closed captioning text and/or voice to text of the associated audio portion of the video content and text is recognized using optical character recognition of text associated with the video. In one embodiment, the content server 106 associates an identifier, such as a number, a time stamp, a location, a time segment, and/or a scene, with the video content and associate this identifier with the determined key terms and words associated with the video content in an inverted index. Other indexing techniques can be utilized by an indexer to index video content. Processed and stored video content is referred to as a video article herein.

In one embodiment, each indexed document or video article is assigned a page rank according to the document's link structure. The page rank serves as a query-independent measure of the document's importance. An exemplary form of page rank is described in U.S. Pat. No. 6,285,999, which is incorporated herein by reference. The search engine 104 assigns a score to each document based on the document's page rank (and/or other query-independent measures of the document's importance), as well as one or more query-dependent signals of the document's importance (e.g., the location and frequency of the search terms in the document).

The front-end server 102 includes the provided links or other content in a search results page, which is transmitted to the client 118. The user can then review the search results to the original query and thereby view the associated results.

Referring now to FIGS. 2-6, exemplary embodiments of various methods relating to querying, ranking, and viewing video content are described. These methods are provided by way of example, as there are a variety of ways to carry out methods according to the present invention. The methods described herein are according to embodiments carried out by the system 100 as described in conjunction with FIG. 1 by way of example. However, other systems may be used to perform the methods.

Figure 2:
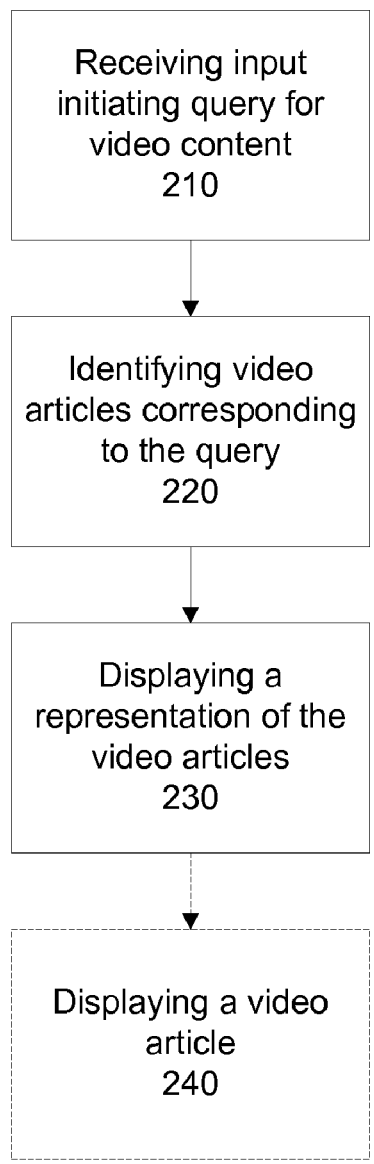
FIG. 2 is a flowchart illustrating a method of providing video content as a result of a search query according to one embodiment of the present invention.

Referring now to FIG. 2, it is a flowchart illustrating a method of providing video content as a result of a search query according to one embodiment of the present invention. The method begins by receiving 210 input initiating a query for video content. The process is initiated via a client device 118 as described above.

Figure 7A:
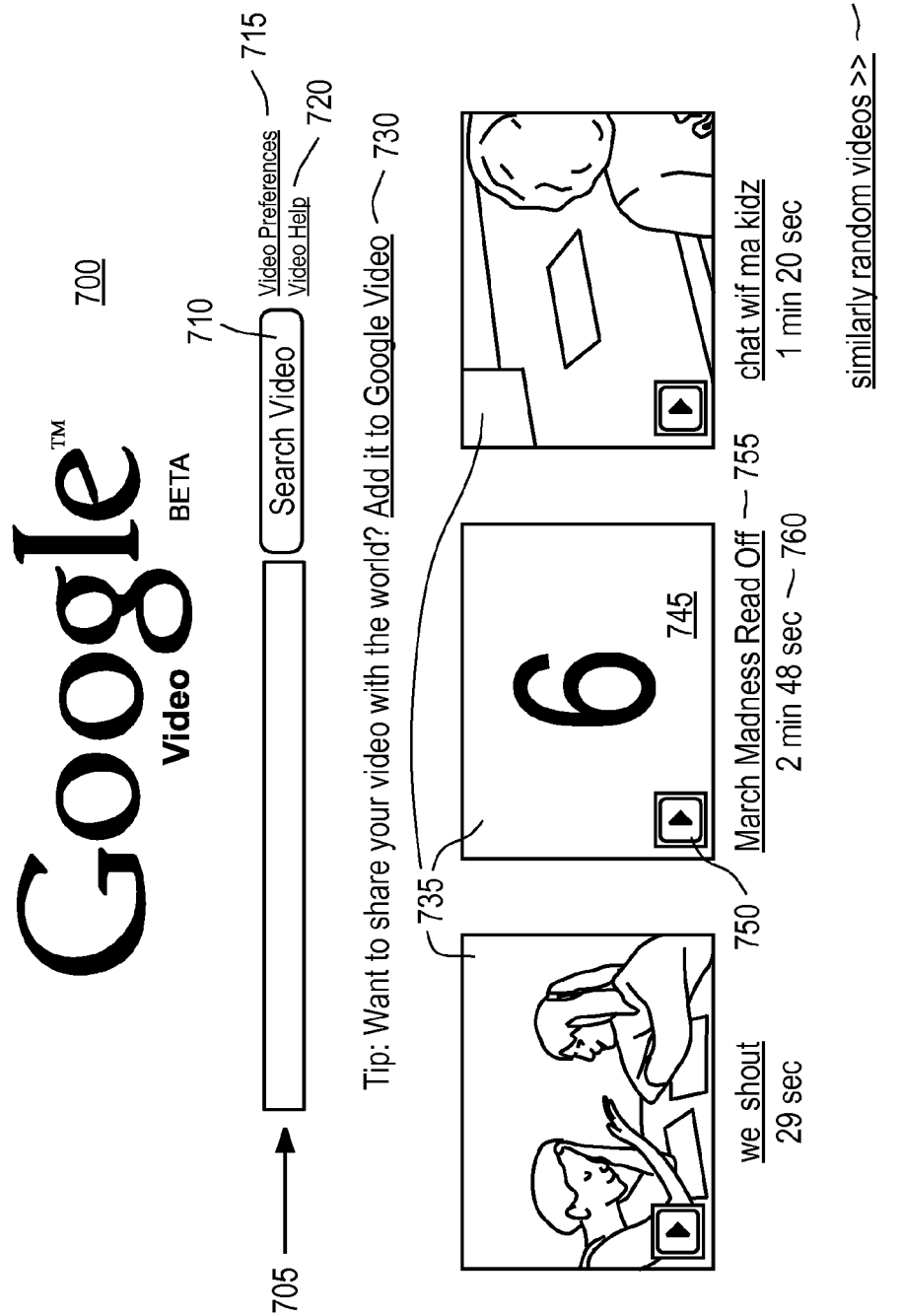
FIGS. 7a-b are illustrations of sample video query pages according to one embodiment of the present invention.

In one embodiment, the query is text based, wherein a user enters a query for video content by entering one or more search terms. For example, using a client device 118, the user enters the search term "wilma" into a query field in a web page, for example field 705 as shown in FIG. 7a.

In another embodiment, the query is image based. For example, key terms are identified as associated with a video article, from program guide information, key words from audio or closed captioning, or the like. Then content data is generated using the terms and is associated with one or more images in the video article, and the data is stored, for example, in a tag. Thus, the user can search by indicating the image as the search criteria, for which the associated key term is used as the query.

In yet another embodiment, the query is based upon selection of visual content associated with a video article. For example, text displayed with a video article, for example from closed captioning data, can be highlighted or otherwise selected and used as a query. In yet another embodiment, a query is based on a combination of two or more of text, image, and visual content.

Next one or more video articles are identified 220 corresponding to the query. For example, a search is conducted in response to receiving the query in one embodiment. For example, the video content in, e.g., a content database, is searched to generate a set of relevant search results according to a query corresponding to any of the above-discussed embodiments. The set of relevant search results can include one or more search results. The set of relevant search results are output to the user via client 118 in one embodiment.

The relevant video articles determined in this block can be potentially numerous compared to the search result that may ultimately be returned to the user following ranking, sorting, and presenting the relevant video articles. The relevant video articles determined in this block can be sorted by relevance using a traditional method, or can be sorted by date and time.

In one embodiment, a total number of relevant video articles T in the set of relevant video articles is determined. The total number of relevant video articles T reflects all of the video articles determined to be relevant to the search in one embodiment. In another embodiment, a number less than the total (e.g., a maximum of 100, or as many as can be processed within a given amount of time) is used. In one embodiment, the variable T is used in connection with a counter n, wherein the counter begins at 1, which represents the first relevant video article, and proceeds until it reaches the number indicating the last relevant video article, T.

Figure 4:
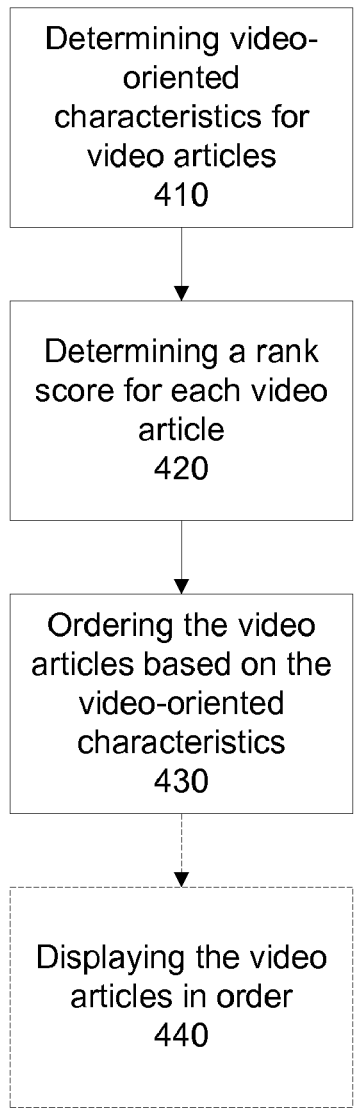
FIG. 4 is a flowchart illustrating a method ranking video articles according to one embodiment of the present invention.

In addition, in one embodiment the video articles may be ranked or otherwise ordered, for example, according to the process described in conjunction with FIG. 4.

Figure 9A:
Figure 9A:
Figure 9A:
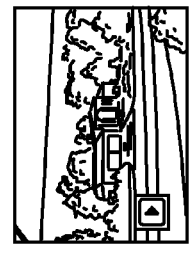
Figure 9A:
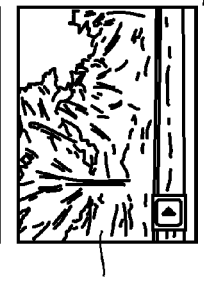
Figure 9B:
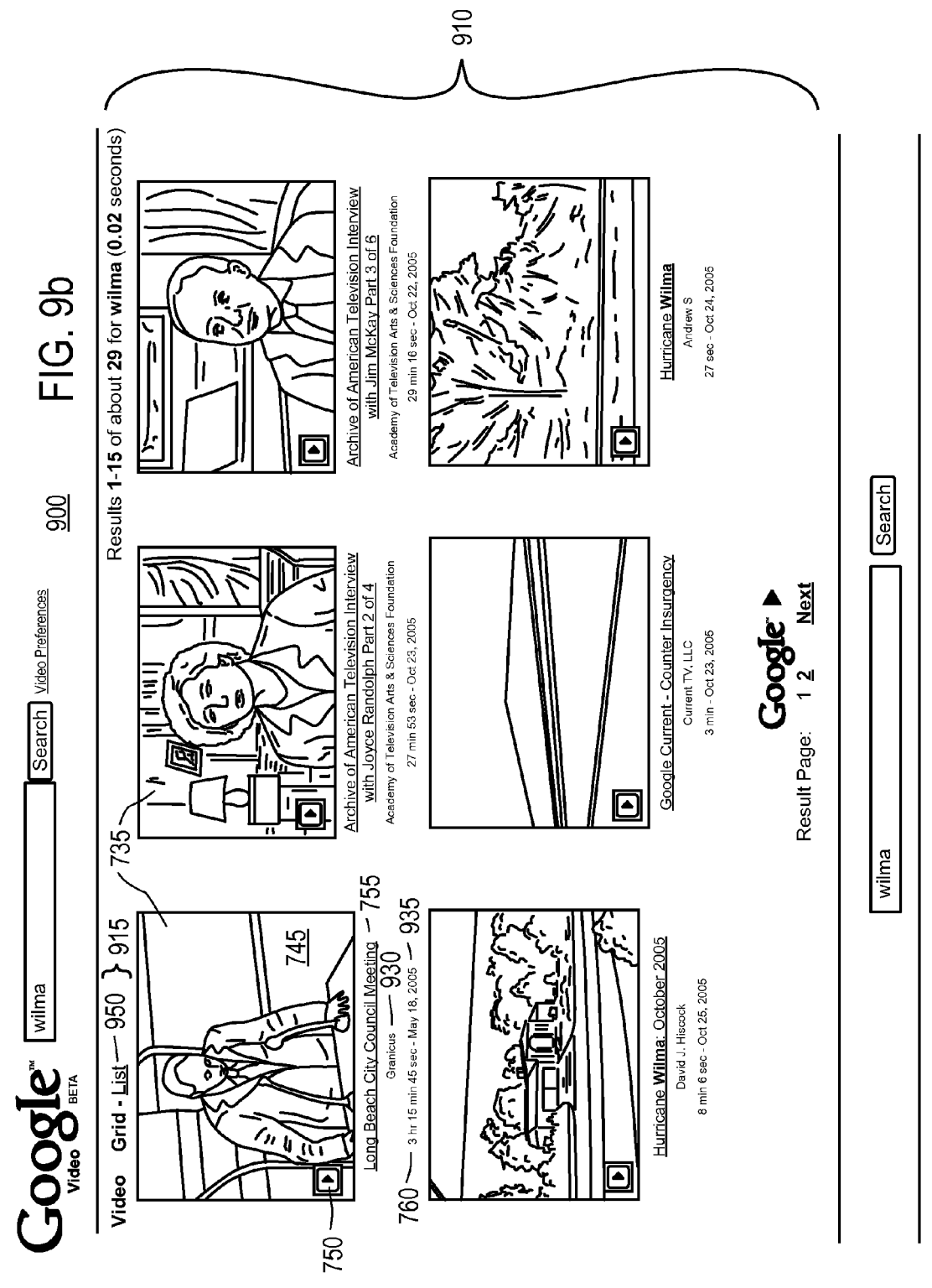

Next, a representation of the video articles is displayed 230. In one embodiment, at least one video article relevant to the search query is determined. Video search results can be returned as a result set formatted as a list or grid to the client from which the search query originated, examples of which are shown in FIGS. 9a-b. Each search result can comprise a video article identifier, a thumbnail image, a search term index, and text associated with a video article. An indicator can provide a visual indication of where one or more search terms are located within the video article.

The video article identifier or article identifier can be, for example, a Uniform Resource Locator (URL), a file name, a link, an icon, a path for a local file, a name or title of the video article, or any other suitable article identifier. The thumbnail image can comprise a still image from the video article (e.g., a scene), a title page for the video article, a title for the video article, a blank space, or any other indicia associated with the video article as known in the art.

Text associated with a video article comprises, in one embodiment, an article, a title associated with the video article, a title for the program associated with the video article, the size of the video article, the date of the video article was aired, a category associated with the video article, a snippet, broadcast source data, broadcast time period data, and related links. The snippet can be text from the video article, such as a portion of dialog that relates to the thumbnail image. The text associated with the video article can be stored on the content server 106.

One embodiment lists the top three video articles as hyperlinks and to list a single hyperlink to all other relevant video articles, which the user can select if the desired video article is not located within the three hyperlinks. In another embodiment the results can be presented on a home page such as a one-click-away page. A one-click-away page can comprise a listing of frequently viewed video articles or video articles determined to be of interest to the user. In another embodiment, frequently accessed video articles, or video articles otherwise associated with high user interest can be added to a link library. The link library can comprise, for example, a set of links to video articles on the network and can include, for example a favorites folder or other set of URLs frequently visited by the user.

In a final optional step, the user may select a video article, which is then displayed 240, or played. Various methods for display of the video article are used in the various embodiments. In one embodiment, a portion of a video article is played in response to receiving a user click on a thumbnail, link, or indicator. For example, if a user clicks on or selects an indicator, the portion of the video article associated with the indicator is played for the user. In one embodiment, the user selects an icon within a thumbnail associated with a video article, causing the video article to play inside the thumbnail frame, for example, as descried in conjunction with FIGS. 7*a-b* and 9*a-b*. In another embodiment, the user selects the video article to play in a larger format, for example, as described in conjunction with FIG. 10*a*.

Figure 3:
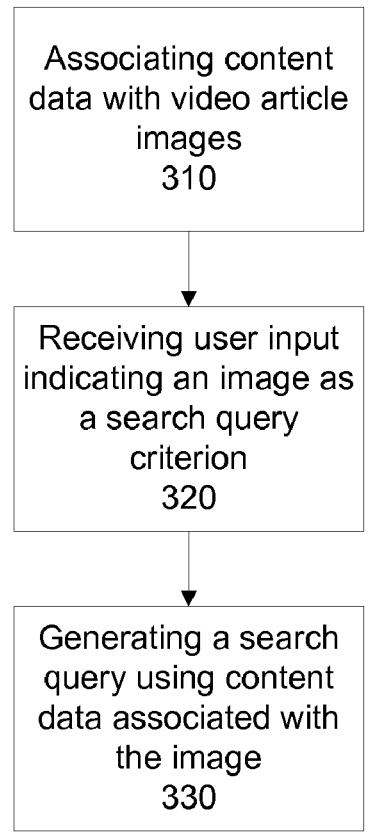
FIG. 3 is a flowchart illustrating a method of formulating a search query according to one embodiment of the present invention.

Referring now to FIG. 3, it is a flowchart illustrating a method of formulating a search query according to one embodiment of the present invention. The method of FIG. 3 in one embodiment is a method of receiving input initiating query for video content 210 as described in conjunction with FIG. 2. In another embodiment, the method of FIG. 3 is a stand-alone process.

As an initial step, the process may begin with receiving a query for video content, using a process such as that described in conjunction with FIG. 2.

The first step in the process is associating 310 content data with video article images. Associating such content allows the user to select an image as the subject of a search query, for which the associated content data is substituted, for example, as a search term. Examples of content data include, but are not limited to, a key term, term, a word, text, number, symbol, a string of alphanumeric characters, a category, and or combination thereof. In one embodiment, the system receives video content such as a video article from a content provider or broadcast system. Using collected information, the system embeds or otherwise associates a tag with an image in a particular portion of the video article, wherein the tag includes content data for the video article. A tag can include, but is not limited to, a data structure, a string, a code, and/or characters. In one embodiment, content data includes a key term that represents a commonly used or recognized name or word for a respective image of a video article. Various information is used in various embodiments to identify the content data, including but not limited to, program guide information, key terms and words from audio in a video article, closed captioning text, key terms or words associated with the video article, key terms or words associated with a matching or similar image previously stored in a database.

For example, the system first identifies a key term "Sylvester Stallone" from program guide information and key words from audio or closed captioning for the movie "Rocky." The system generates content data using the key term and associates it with an image of Sylvester Stallone in the movie "Rocky," including the content data in a tag. Thus, the key term "Sylvester Stallone" can be used as a query associated with an image of Sylvester Stallone in the movie "Rocky." In one embodiment, the may include additional terms. Continuing the example above, a tag for an image of Sylvester Stallone in the movie "Rocky" might also include categories, such as words "actor" and "action." Various images in video content or a video article can be associated with video content, including but not limited to, faces, persons, musicians, actors, actresses, artists, celebrities, places, locations, things, objects, automobiles, ships, weapons, instruments, activities, architecture, and landscapes.

In one embodiment, multiple images in a video article can be associated with respective content data in the same manner as discussed above. In other embodiments, each image in a video article can be associated with various content data such as multiple key terms, or words. In some embodiments, a tag for an image can include a key term or word for a "category" with which the image can be associated, such as the example "actor" described above. In yet another embodiment, visual content associated with the video article, such as text content, can be associated with content data in the manner described above.

In one embodiment, an image detection means determines whether a stored image matches the image of interest. In one embodiment, the image detection means if a face detection means determines whether a face in a previously stored image file matches a face in a particular portion (image of interest) of a video article. If a match is determined, content data such as a key term or word associated with the previously stored image file, and a tag is generated for the image of interest. The tag can be embedded in the video article, or otherwise associated with the face in the particular portion (image of interest) of the video article. In this example, a face such as Sylvester Stallone in a previously stored image file for the movie "Rocky 2" can match an initial image of the face of Sylvester Stallone in a particular portion of a video article such as the opening fight scene in the movie "Rocky." In some instances, previously stored image files may not match or bear a similarity to a face in a particular portion of a video article. If no previously stored images are available to search or match, program guide data, close captioning information, and/or audio from the video article is used to determine that an image of a person's face is the face searched for.

In another embodiment, the image detection means is a location detection means. The location detection means determines whether a location in a previously stored image file matches or is otherwise similar to a location in the particular portion of a video article. A tag including content data can be retrieved or generated and associated with the location information, via the process described above with respect to the face detection means.

Next, user input is received 320 indicating an image as a search query criterion. In one embodiment, a selection can be received, for example, from a client device, as transmitted or otherwise input in various ways including, but not limited to, a remote control command, a mouse click, a keyboard entry, a voice input from a user, an input from an input device, or a command from a user. For example, while viewing, a particular video article, the user places the indicator adjacent to or over an image in the video article. When the indicator is adjacent to or over the image, any content data, such as icons, key terms, or words in a tag and associated with the image, is displayed to the user. Then, the user selects the image of interest, for example, by pushing an "enter" or input button on a remote control or keyboard to indicate selection of the image. Selection information is then transmitted, for example, from the client to the server via a network.

Then a search query is generated 330 using content data associated with the image. In one embodiment, after receiving selection information, the system utilizes content data such as the tag, icon, and/or key terms or words associated with the selected information to generate a search query for video content. The query is based at in part on some of the selection information and on some of the content data associated with the image of interest in one embodiment. Using this information, a search for the query information is performed by the system, for example, in response to the user clicking a "search" button.

In addition, after an initial set of results from a search query have been received by the user, the user can perform a second query in a similar manner. For example, the user moves the indicator away from the image in the particular portion of the video article to another image in the video article. Selecting the next image causes it to become the subject of the query as described above. In other embodiments, an additional search query is manually entered by a keyboard or other input device. In yet another embodiment, a first query is manually entered by a keyboard or other input device, and the second query is performed in the above-described manner.

In other embodiments, multiple key terms or words can be used in a search query by the selection of multiple images in a video article. In this example, the multiple terms are used for the query.

FIG. 4 is a flowchart illustrating a method ranking video articles according to one embodiment of the present invention. The method of FIG. 4 in one embodiment is a method of ranking video articles identified 220 in conjunction with FIG. 2. For example, as the result of an explicit or an implicit search query. An implicit search query can be generated from contextual clues associated with a client. In another embodiment, the method of FIG. 4 is a stand-alone process. The method can be carried out independent of receiving a video search query, for example, by determining a query independent score for video articles based on user behavior data associated with the video articles. The query independent score can be displayed in a toolbar within a media player or media browser or other application window displaying a video article associated with a query independent score.

The process begins by determining 410 video-oriented characteristic(s) for one or more video articles. In one embodiment, a video-oriented characteristic comprises at least one of the following: broadcast source data, broadcast time period data, third-party ratings data, user data, textual data, a name associated with a video article, a name associated with a content provider, a number of times the video article has been broadcast, a number of content providers that broadcast a particular video article in a defined time period, a particular time period a video article has been broadcast, a particular date a video article has been broadcast, a particular geographical location a video article has been broadcast, third-party ratings data for a particular video article, third-party audience viewing data for a particular video article, a number of times other users have selected a particular video article in response to different queries, a number of times other users have selected a particular video article in response to the same query, clickthrough data associated with a video article, queries associated with a video article, a broadcast source associated with a video article, broadcast time period data associated with the video article, third-party ratings data associated with the video article, third-party data associated with a video article, user data associated with a video article, and textual data associated with the video article.

According to one embodiment, determining 410 a video-oriented characteristic for a video article comprises receiving one or more video articles and comparing the video article(s) to a plurality of video articles in a database, for example a database associated with content server 106. In another embodiment, video-oriented characteristics can be received from a pre-existing database such as a video-oriented characteristic database. A video-oriented characteristic database is provided, for example, by constructing such a database with the assistance of a search engine 104, or otherwise establishing communication with such a database.

According to another embodiment, determining 410 a video-oriented characteristic for a video article comprises indexing and storing the video article and video-oriented characteristic in a database. According to yet another embodiment, determining 410 a video-oriented characteristic for a video article comprises receipt of multiple copies or multiple broadcasts of the video article from one or more sources in a defined time period.

According to yet another embodiment, determining 410 a video-oriented characteristic for a video article comprises receipt of data associated with the video article, for example, broadcast time period data, ratings data, third-party data, user data, and textual data. For example, the defined or broadcast time period comprises at least one of the following: a broadcast date, a broadcast time, when a video article is broadcast by a particular content provider, rotation data for a video article broadcast by a particular content provider, whether a video article is broadcast in prime time or non-prime time by a particular content provider, and priority data for a video article broadcast by a particular content provider.

The ratings data according to one embodiment comprises at least one of the following: third-party ratings data for a video article, third-party audience viewing data for a video article, Nielsen ratings data for a video article, "thumbs up" viewer data for a video article, "thumbs down" viewer data for a video article, "replay" viewer data for a video article, "record" viewer data for a video article, "fast forward" viewer data for a video article, "review" viewer data for a video article.

According to one embodiment, the third-party data comprises at least one of the following: production costs associated with a video article, advertising costs associated with a video article, and advertising production costs associated with the video article.

According to one embodiment, user data comprises at least one of the following: a query associated with the video article, clickthrough data associated with the video article, queries associated with the video article, a number of user clicks on the video article returned for the same query, and a number of user clicks on video articles returned for different queries.

According to one embodiment, textual data associated with the video article comprises at least one of the following: dialogue associated with the video article, closed captioning text, speech-to-text conversion of dialogue associated with the video article, text associated with articles referencing the video article, text associated with other video articles referencing the video article, and text associated with documents referencing the video article.

In one embodiment, a search engine 104 receives information indicating a video article associated with a video search query and receives video-oriented characteristic data associated with the video article that has been determined to be relevant to the video query.

For example, if the search query is "billy crystal" then the media-content-management engine can locate all video articles relevant to this query. The articles may comprise, for example, all video articles with the words "billy crystal" in the text, or title, or otherwise associated with the video article. A relevant video article can then be selected, for example, a news clip containing closed captioning text associated with Billy Crystal. Next, the media-content-management engine retrieves video-oriented characteristic data associated with the video article, which is used to formulate a ranking score for the video article. Then, the video-oriented characteristic data is provided to a ranking processor.

A rank score is then determined 420 for each video article. In one embodiment, a rank score is determined based at least in part on the video-oriented characteristic data. The rank score can be determined, for example, by a ranking algorithm that weights the video-oriented characteristic data and/or other ranking factors associated with the video query. Different types of video-oriented characteristic data can have different weights and these weights can be different for different applications. In addition to the video-oriented characteristic data, the ranking processor can utilize conventional ranking methods according to the terms contained in or associated with the video articles. In addition, ranking may be based on relevant bits of video within the video article. For example, some video articles may include multiple bits relevant to the query. As a result, the rank score may be based on the most hits total in one embodiment, or may be based on the most hits closest together in another embodiment. In addition, the result may list the most relevant bits.

Other factors affecting the rank score include length of the video article (e.g., longer equals better rank score), quality of the video article (e.g., higher quality is higher ranked), and sound quality (e.g., higher quality is higher ranked).

Next, the video articles based on the rank score are ordered 430. Using the rank score, the video articles can be ordered in various ways. In one embodiment, the video articles can be ordered based solely on their rank score. In another embodiment, the rank score may be combined with other factors to order the video articles. Examples of other factors that may factor in to the ordering of video articles include the type of video article, time period (e.g., time of day, or day of the week), user location (e.g., to more heavily weight video articles broadcast in close proximity to the user), selection of the video article by previous users (e.g., users querying for the same or similar terms), and whether the video article is available for playback (e.g., video articles available for playback are weighted more heavily). This weighting can be used alone or in combination with other factors.

In a final optional step, the video articles are displayed 440 in order. In one embodiment, once the articles are ordered, they are displayed, for example as shown in conjunction with FIGS. 9*a-b*.

Figure 5:
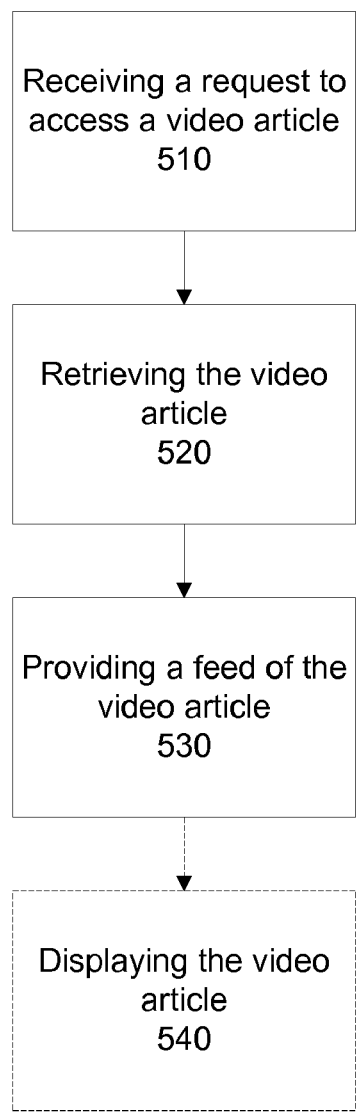
FIG. 5 is a flowchart illustrating a method of playing a video article according to one embodiment of the present invention.

FIG. 5 is a flowchart illustrating a method of playing a video article according to one embodiment of the present invention. The method of FIG. 5 in one embodiment is a method of displaying a video article 240 as described in conjunction with FIG. 2. In another embodiment, the method of FIG. 5 is a stand-alone process.

Figure 13C:
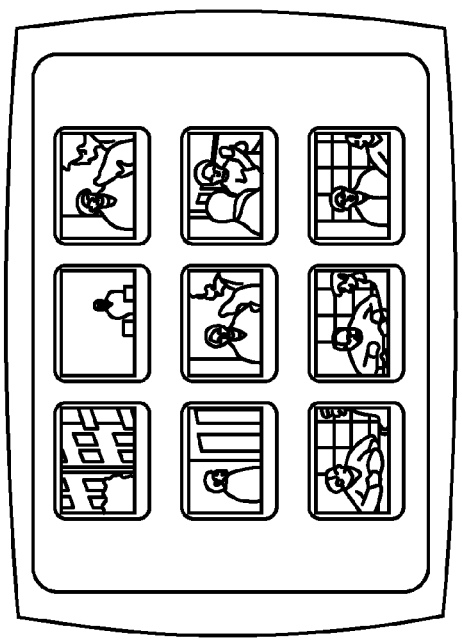
FIGS. 13a and 13c are video article thumbnails according to one embodiment of the present invention.
Figure 13A:
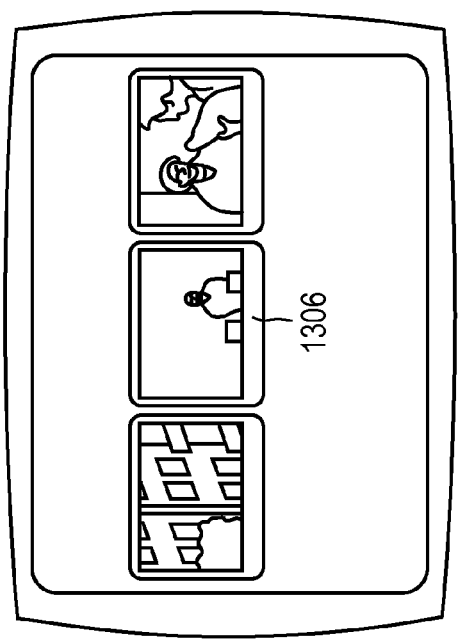

As a preliminary step, a display of video articles, video article identifiers, or video article thumbnails are displayed. Examples of such displays are shown in FIGS. 9*a-b* and 13*a* and *c*. In one embodiment, a first thumbnail display includes segments of a video article, for example three different interviews within the Larry King television program as shown in FIG. 13*a*.

The images or screenshots comprising the thumbnails can be selected based on equally spaced time segments, shot boundaries, program templates, audio signals, or other suitable methods for determining an image representing a segment of a video article. For example, screenshots can be selected every 10 minutes from a 30 minute video article, for example, in order to provide an overview of the content of the video article. Alternatively, screenshots can be taken at scene boundaries. Scene boundaries can comprise transitions from one segment to another within a video article and can be detected by changes in line patterns, lighting, sounds, or other attributes of the content of a video article. Program templates can comprise schemas or registered patterns for a particular program that indicate key aspects of the video content from the program. For example, a program template for Larry King can indicate regions where interviewees commonly appear and can indicate patterns common to transitions between interviewees such as timing patterns or certain image patters accompanying a transition. The system uses these patterns to identify key screenshots indicative of a segment of the video article. Using audio signals to identify images representing a segment of a video article can comprise identifying abrupt changes in the audio portion of a video article than can indicate more significant segments from a video article. For example, a video article comprising a soccer match can contain periods with abrupt audio changes reflecting a crowd's reaction to a scored goal. The abrupt audio change can thus be used to identify a segment of the video article that is better suited to represent particular content within the video article.

The process begins by receiving 510 a request to access a video article. In one embodiment, the user indicates a desired article from a display of video articles of thumbnails, for example by selecting an image with a mouse, remote control, or other suitable navigation or selection device.

Next, the video article is retrieved 520. For example, the front-end server 102 of FIG. 1 may retrieve content from the content server 106 by way of the search engine 104. Then, a feed of the video article is provided 530 the user. Once a selected thumbnail is determined, video content is output based at least in part on the selected thumbnail, for example, as a video feed.

Figure 13B:
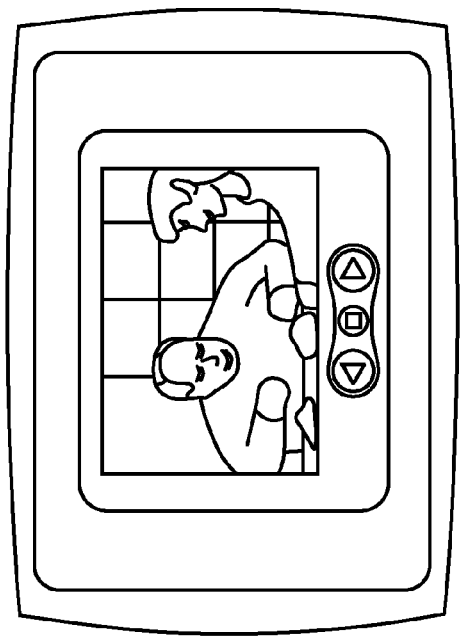
FIG. 13b illustrates an example of a display of a video article for selection of visual content according to one embodiment of the present invention.

In a final optional step, the video article is displayed 540. In one embodiment, a video article is displayed on a device beginning with the segment of the video article represented by the selected image. For example, the user selects the second image 1306 from FIG. 13*a*, representing a second interview within the Larry King program. The system determines that this selection was made and begins outputting video content from the Larry King program beginning with the second interview indicated by the selection of the second thumbnail. An exemplary embodiment of outputting video output is illustrated in FIG. 13*b*.

Further processing occurs in some embodiments, including determining the current segment of the video article playing, receiving input to change from a video article display to a thumbnail display, and presenting a second thumbnail display. Presenting may include determining a number of images close in time to the current video segment, and presenting the number of images as thumbnail displays. An exemplary embodiment of a second thumbnail display is shown in FIG. 13*c*.

Figure 6:
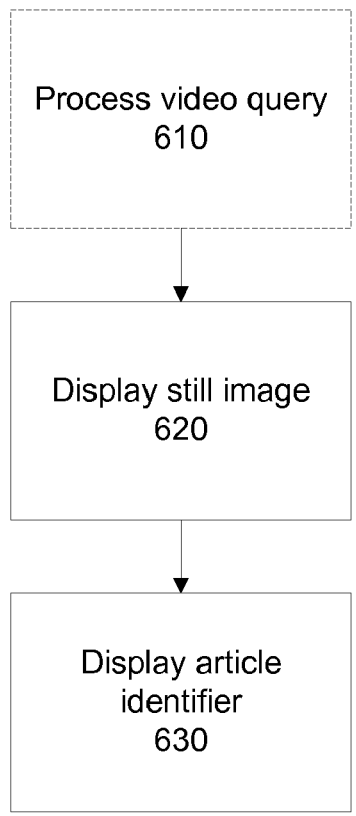
FIG. 6 is a flowchart illustrating a method of displaying results of a search query according to one embodiment of the present invention.

FIG. 6 is a flowchart illustrating a method of displaying results of a search query according to one embodiment of the present invention. The method in one embodiment displays a representation of a video article query result from a query for video content.

As a preliminary step, a query for video content may be processed 610, for example, as described in conjunction with FIG. 2. Then, a still image associated with a video article query result is displayed 620. In one embodiment, the still image represents a video article, which may be played by selecting an icon within the still image. The still image is a thumbnail according to one embodiment. An article identifier associated with the video article query result and the still image is displayed 630. In one embodiment, the article identifier is displayed concurrent with the still image. In one embodiment, there are two views for displaying the still image and video article identifier, e.g., the list and grid views described in conjunction with FIGS. 9a-b.

In addition, other items associated with the video article also may be displayed, such as text, a source for the video article, the time of broadcast, date of broadcast, and the duration of the video article, as described in conjunction with FIGS. 9a-b.

FIG. 7a is an illustration of a sample video query page 700 according to one embodiment of the present invention.

The sample video query page 700 includes user interface elements for searching for video content 705-720, uploading video content 730, and viewing video content 735-760.

Figure 8A:
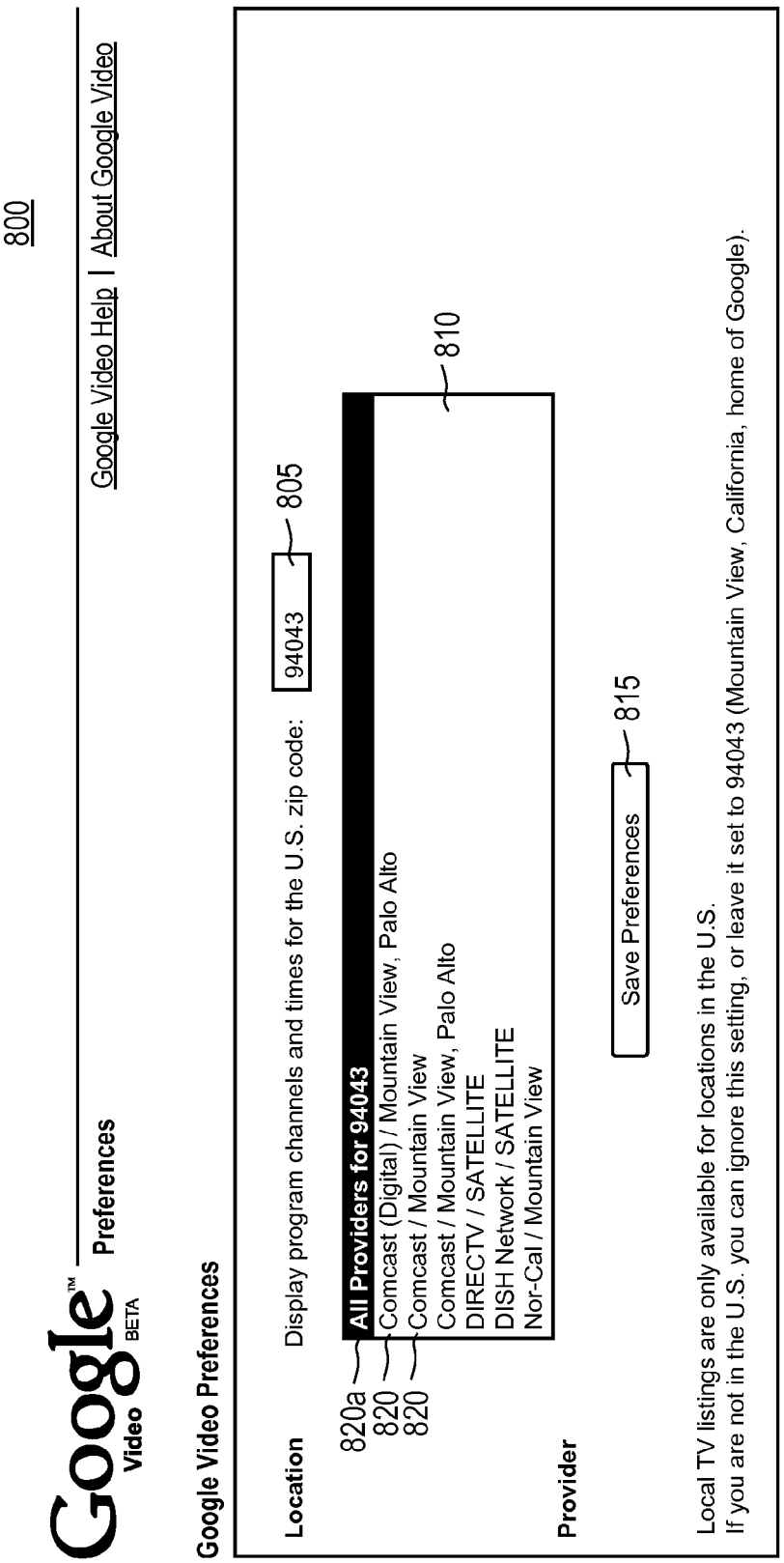
FIG. 8a is a video preferences screen according to one embodiment of the present invention.

The elements for searching for video content include an input field 705, a search button 710, a video preferences button 715, and a video help button 720. The input field 705 is configured for receiving user input indicating one or more criteria for a search for video content. The user input may comprise alphanumeric characters, symbols, or other characters that may be input by a user. In one embodiment, the text input field 705 is configured to accept input of characters designating a category for searching, such as by the title of a program or the channel on which the program played, e.g., [title:nightline] or [channel:abc]. The search button 710 initiates a search for the request input in the input field 705. No action is taken on the request until the user clicks on the search button 710 in one embodiment. In another embodiment, the user may initiate the search by hitting an enter or return key, e.g., on a standard keyboard. After the search is initiated, results corresponding to the query are displayed to the user as described in conjunction with FIGS. 9a-b The video preferences button 715, when clicked, takes the user to a video preferences screen 800, one embodiment of which is depicted in FIG. 8a. Referring now to FIG. 8a, the video preferences screen 800 allows a user to select one or more locations and providers for the video content. The video preferences screen 800 includes a location code field 805, a provider selection area 810, and a save preferences button 815. The location code field 805 allows the user to input a location code, thereby designating channels and times associated with a particular geographical area. In the embodiment displayed in FIG. 8a, the location code is a United States zip code. In other embodiments, the location code is a postal or other code for another geographical area, for which the location code field 805 is configured for receiving the corresponding code. Changing the location code in the location code field 805 updates the listing in the provider selection area 810.

The provider selection area 810 lists a choice of providers 820 for the video content, as determined by the location code entered in the location code field 805. The user may select a particular provider 820, or all providers 820a as desired. This allows the user to search for video content specific to the user's geographical area, or another geographical area of choice. The user clicks the save preferences button 815 to save the elections and return to the sample video query page 700.

Referring again to FIG. 7a, the video help button 720, when clicked, takes the user to a video help screen 825, one embodiment of which is depicted in FIG. 8b. Referring now to FIG. 8b, the video help screen 825 provides answers to frequently asked questions and provides links to more detailed topic information.

Referring again to FIG. 7a, the sample video query page 700 also includes an add video content button 730. The add video content button 730, when clicked, takes the user to a video upload screen 830, one embodiment of which is depicted in FIG. 8c. Referring now to FIG. 8c, the video upload screen allows users and large production facilities to upload video content and associated information.

Referring again to FIG. 7a, the elements for viewing video content 735-760 include video display elements 735 and an additional video display element link 740. The video display elements 735 show a still image representing one or more video articles. In one embodiment, the sample video query page 700 displays three video display elements 735 comprising video articles selected at random from all stored video articles.

Figure 7B:
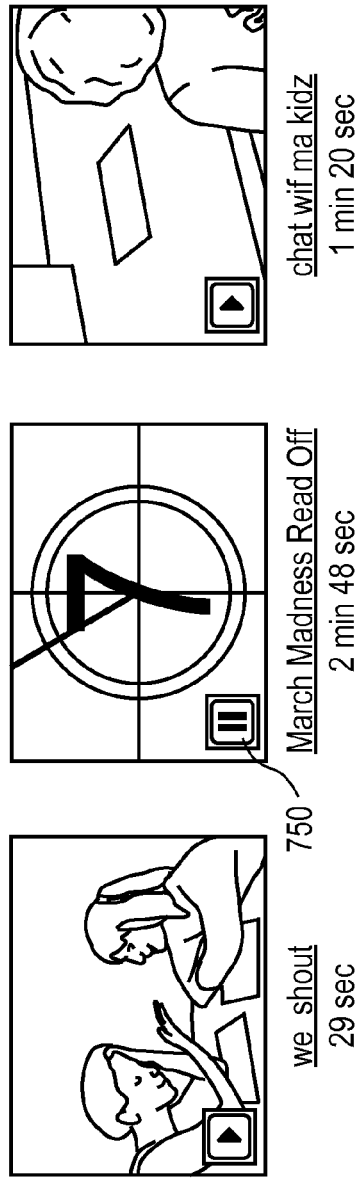

The video display elements 735 in one embodiment include a video display area 745, a start video button 750, a video article name 755, and a video article length 760. The video article is displayed within the video display area 745. Initially, the video display area 745 displays a still image representing the video article. Then, upon user activation of the video article, e.g., by clicking the start video button 750, the video article plays in the video display area 745. The start video button 750 in one embodiment comprises a triangle or other indication that clicking it plays the video article. In one embodiment, the start video button 750 acts as a toggle. When the video article is playing, the start video button 750 comprises two parallel lines or other indication that clicking the start video button 750 pauses the video article, as shown in FIG. 7b. If a video article cannot be played for any reason, the start video button is absent from that video article. The video article name 755 is displayed, e.g., below the video display area 745. The video article name 755 may include program and episode information, e.g., for broadcast video articles, and/or a title or other brief content description, e.g., for video articles uploaded by a private user. The video article length 760 is displayed, e.g., below the video display area 745, and indicates the duration of the video article. The video display elements 735 may be configured in a different manner according to other embodiments.

The additional video display element link 740, when clicked, takes the user to a random video page 765, one embodiment of which is shown in FIG. 7c. The random video page 765 displays a set of video articles selected at random from all stored video articles. The random video page 765 includes some elements of the sample video query page 700, such as one or more input fields 705, search buttons 710, and video preferences buttons 715. The random video page 765 also includes a random video display area 770, where video display elements 735 of randomly selected video articles are shown. In one embodiment, the random video display area 770 includes fifteen video display elements 735. Other embodiments may include more or fewer video display elements 735. In addition, the random video page 765 includes one or more another video set buttons 775, which when clicked take the user to yet another set of video articles on a similar random video page 765 (not shown).

Referring again to FIG. 7a, when a user enters input indicating one or more criteria for a search for video content into the text input field 705, and initiates the search as described above, the user is taken to a video display screen, one embodiment of which is shown in FIG. 9a.

Figure 12:
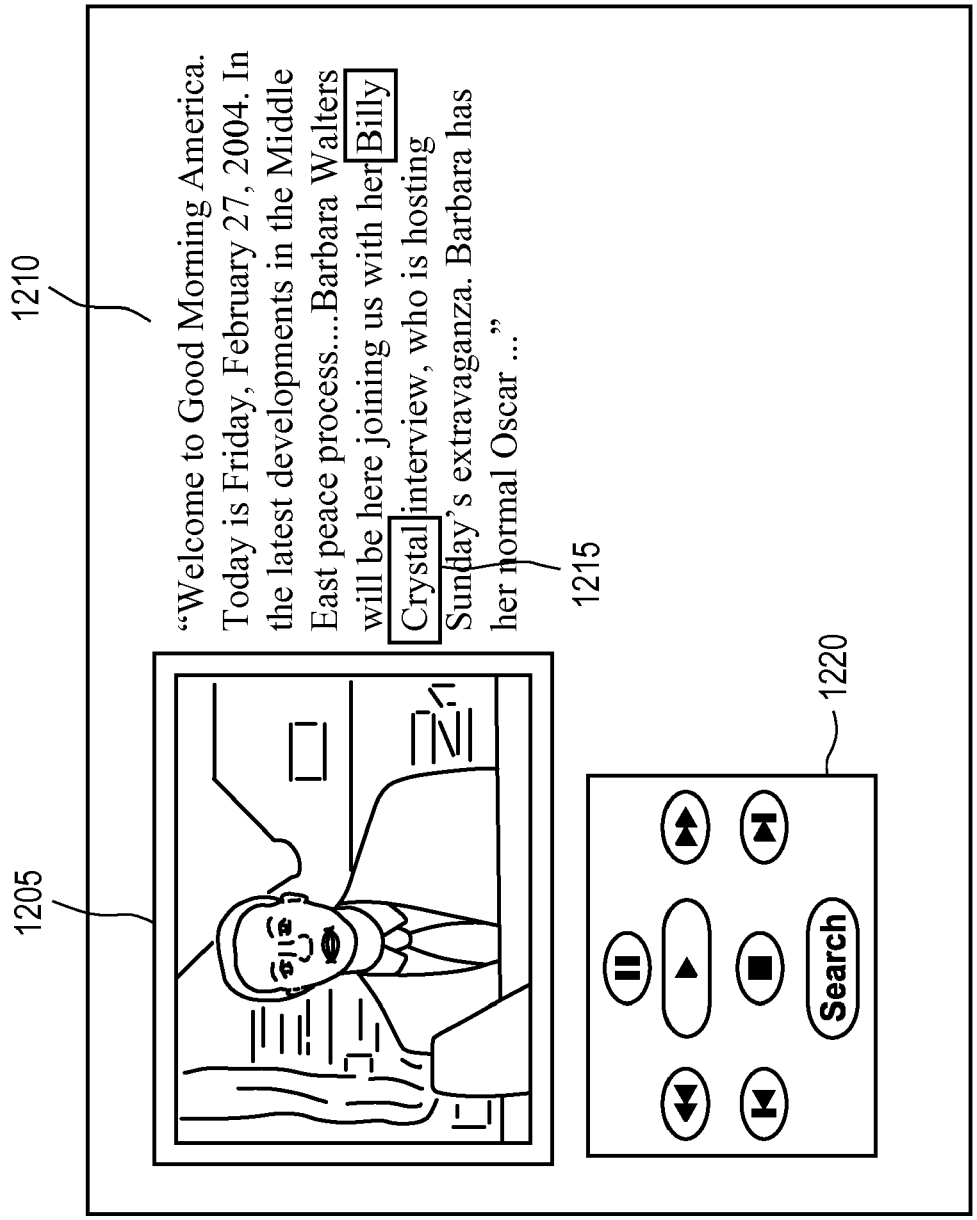
FIG. 12 illustrates an example of a display of a video article for selection of visual content according to one embodiment of the present invention.

In another embodiment, the user submits a search query by selecting a text string, such as a word or a phrase, in text content associated with a video article. FIG. 12 illustrates an example of a display of a video article for selection of visual content. A thumbnail or display 1205, for example a still image of a video article, is shown, along with text 1210 associated with the video article. The text 1210 can include text describing audio content, video content, on-screen text content (e.g., closed captioning), text summarizing the video article contents, and/or text describing the video article type.

Using a mouse, or any other suitable device that can access the displayed text content 1210, the user highlights, or marks in any other suitable way, a phrase 1215 within the text 1210, e.g., "Billy Crystal" 1215 as a query basis. The user then submits the query by, e.g., pushing an enter or return button, or by clicking on a search button in a controls interface 1220. Alternatively, the visual search query can be submitted by highlighting alone, i.e., without the need to click on the search button. In one embodiment, text 1215 selection is received only when a displayed video article is paused. In another embodiment, portions of scrolling text 1210 may be selected as the video is playing. In various embodiments, the presented video article(s) may or may not be part of a search result set.

Referring to FIGS. 9a-b, screen shots of search results displayed in a list view or in a grid view, respectively, in accordance with exemplary embodiments of the present invention are illustrated. As shown in FIG. 9a, the first four (4) of about twenty-nine (29) search results are shown. The search results are in response to a search query for "Wilma," for example using the system described above in conjunction with FIG. 1. In the displayed embodiment, the search results are sorted by relevance, for example using a ranking method such as the one described in conjunction with FIG. 4. In another embodiment, the search results are sorted by date. In other embodiments, the search results are sorted in accordance with sorting methods as known in the art. To display another set of search results, the user can click on a numbered result page or the "Next" link.

Referring now to FIG. 9a, a portion of one embodiment of a video results page 900 is shown, described here in greater detail. The video results page 900 includes one or more input fields 705, search buttons 710, and video preferences button 715 as described in conjunction with FIG. 7a, however, the input field(s) 705 displays the query 905 entered by the user. In this example, the input 905 is "Wilma."

The video results page 900 includes a video results display 910. In one embodiment, the video results display 910 has two different view formats. In the embodiment displayed in FIG. 9a, the video results display 910 is in "list" format, as indicated by the format links area 915. Selecting the grid link 920 from the format links area 915, takes the user to a "grid" display format of the video results display 910, a portion of one embodiment of which is discussed in conjunction with FIG. 9b.

The video results display 910 includes video display elements 735 like those discussed in conjunction with FIG. 7a. The video display elements 735 include a video display area 745, a start video button 750, and a video article name 755 as described above. In one embodiment, the video display area is a "thumbnail," or a much reduced representation of the video article. As described in conjunction with FIG. 7a, if the start video button 750 is displayed within the thumbnail 745, clicking on it will play the video article within the thumbnail 745. Alternatively, clicking on the thumbnail 745 itself takes the user to a video article display page, one embodiment of which is discussed below in conjunction with FIG. 10a.

In the list format shown in FIG. 9a, the video article name 955 is displayed beside the video display area or thumbnail 745. In addition, the video display element includes a subtitle or description 920 and text 925, or metadata, associated with the video article, in which the query 905 appears. In one embodiment, just one portion of the text 925 is shown. For some video articles, no text 925 is displayed, as none is available. The query 905 within the text 925 is distinguished in one embodiment, e.g., in bold font or otherwise displayed differently than the remainder of the text 925. The text 925 in one embodiment is text associated with the video article, e.g., closed captioning text or text submitted with the video article. In one embodiment, the text may include links (not shown) to content related to the video article, subject matter, or channel. The video display element 735 also includes the source 930 of the video article, date and time of original broadcast 935, and a video article length 760 as described above.

In one embodiment, the video results display 910 includes result statistics 940. In the embodiment shown, the statistics include information about which results are displayed on the page, the total number of results, and the total time to produce the results. In addition, the video results display 910 includes links 945 to any additional pages of results.

In one embodiment, a video display element 735 also includes a segment indicator 947. As shown, the indicator 947 is segmented into ten (10) segments with each segment representing a set amount of time of the video article. According to one embodiment, the indicator 947 can provide a visual indication of the relative location wherein one or more search terms are located within the video article. The indicator 947 can take various forms. For example, three embodiments of indicators 947 are shown in FIGS. 11a-c.

Figure 11A:
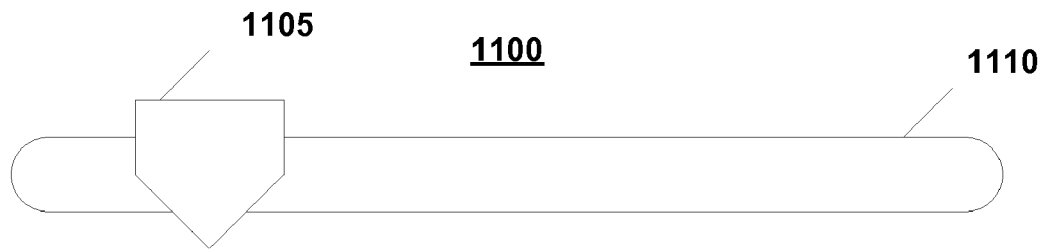
FIG. 11a is an illustration of a slide bar according to one embodiment of the present invention.

Referring to FIG. 11a, a slide bar 1100 is shown in accordance with an embodiment of the present invention. The slide bar 1100 comprises a slide 1105 and a bar 1110. The slide 1105 indicates a relative location within a video article where a search term is located. The bar 1110 represents the entire length of the video article. In one embodiment, if a user clicks on the bar 1110, the slide 1105 moves to another relative location where a search term is located. For example, if the bar 1110 is clicked on to the right of the slide 1105, then the bar 1110 moves to the next relative position where a search term is located; likewise, if the bar 1110 is clicked on to the left of the slide 1105, then the bar 1110 moves to the previous relative position where a search term is located. In other embodiments, other navigational tools can be used as known in the art.

Figure 11B:
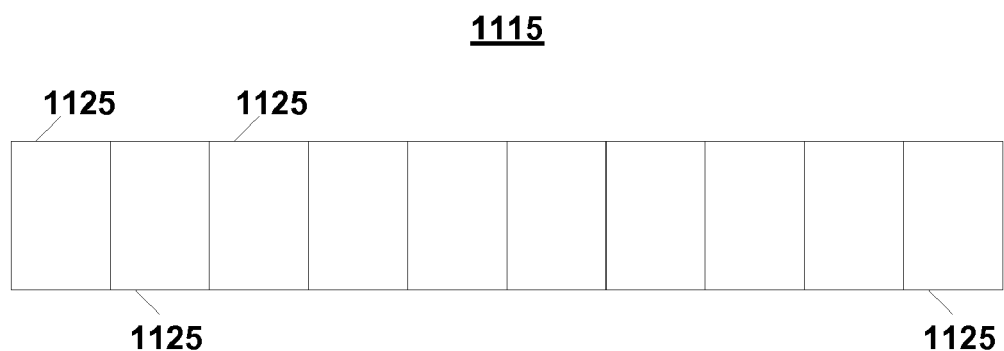
FIGS. 11b-c are illustrations of segmented indicators in accordance with embodiments of the present invention.
Figure 11C:
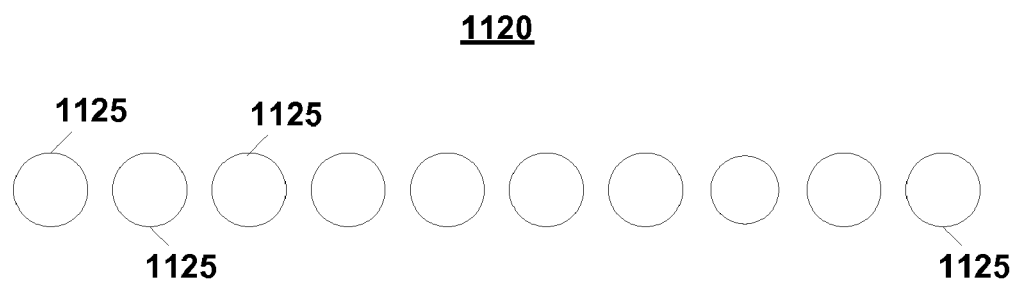

Referring to FIGS. 11b-c, segmented indicators in accordance with exemplary embodiments of the present invention are shown. Two different indicator types 1115, 1120 shown are separated into segments 1125. In these embodiments, each segment 1125 represents an equal time segment. For example, if the video article is an hour program then the first segment 1125 represents the first six (6) minutes of the video article, the second segment 1125 represents the second six (6) minutes of the video article, etc. Similarly, if a program is a half hour in length, then each segment 1125 represents three (3) minutes, with the first segment 1125 representing the first three (3) minutes, the second segment 1125 representing the second three (3) minutes, etc. Thus, the length of time of the segments can equal the length of the program divided by the number of segments. Although the Figures shown include ten segments (10), the number of segments may vary in other embodiments. In another embodiment, each segment 1125 can represent a scene or act in the program. For example, the first segment 1125 can represent the opening scene of the program, the second segment 1125 can represent the second scene of the program, and so forth.

To further assist the user, the segments 1125 can provide a visual differentiation to indicate which segment or segments of the video article contain a search term. The visual differentiation can be color, shape, highlight, boarder, or other visual differentiation as known in the art.

In another embodiment, the visual differentiation can contain levels. For color differentiation, a color can represent the number of search terms represented in a segment of the video article. For example, black can represent zero search terms, blue can represent one search term, red can represent two search terms, and green can represent three or more search terms.

To further assist the user, visual differentiation can be used to differentiate search terms when a search query contains two or more search terms. In such an embodiment, colors can represent search terms. For example, black can represent a segment containing no search terms, blue can represent a segment containing a first search term, red can represent a segment containing a second search term and yellow can represent a segment containing a first search term and a second search term.

Referring now to FIG. 9b, a portion of one embodiment of a video results page 900 is shown. In the embodiment displayed in FIG. 9b, the video results display 910 is in a "grid" display format, as indicated by the format links area 915. Selecting the list link 950 from the format links area 915, takes the user to a "list" display format of the video results display 910, such as described above.

The video results display 910 is similar to that described in conjunction with FIG. 9a. The video display elements 735 in the grid format include a video display area or thumbnail 745, a start video button 750, a video article name 755, a source 930 of the video article, a video article length 760, and the date of original broadcast 935, which function as described above. The thumbnail 745 is configured for playing the video article within, as described above.

Referring now to FIGS. 9a-b, the thumbnails 745 displayed may be ordered according to several different methods. In one embodiment, the thumbnails 745 are ordered according to a ranking, for example as described in conjunction with FIG. 4. In another embodiment, the thumbnails 745 may be ordered by other factors such as chronology, location, or availability of the video article for playback.

Figure 10A:
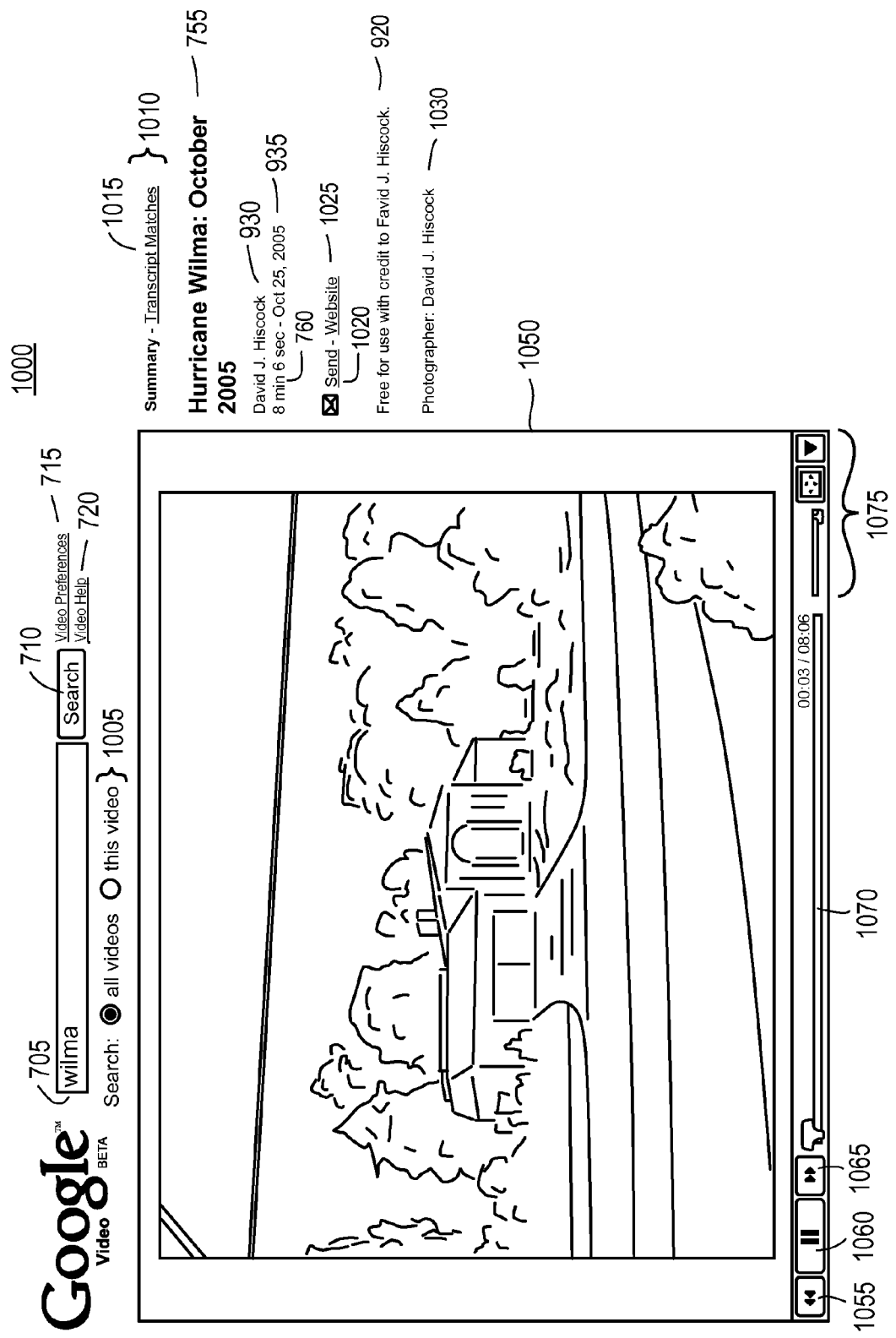
FIG. 10a-b are video article display pages according to one embodiment of the present invention.
Figure 10B:
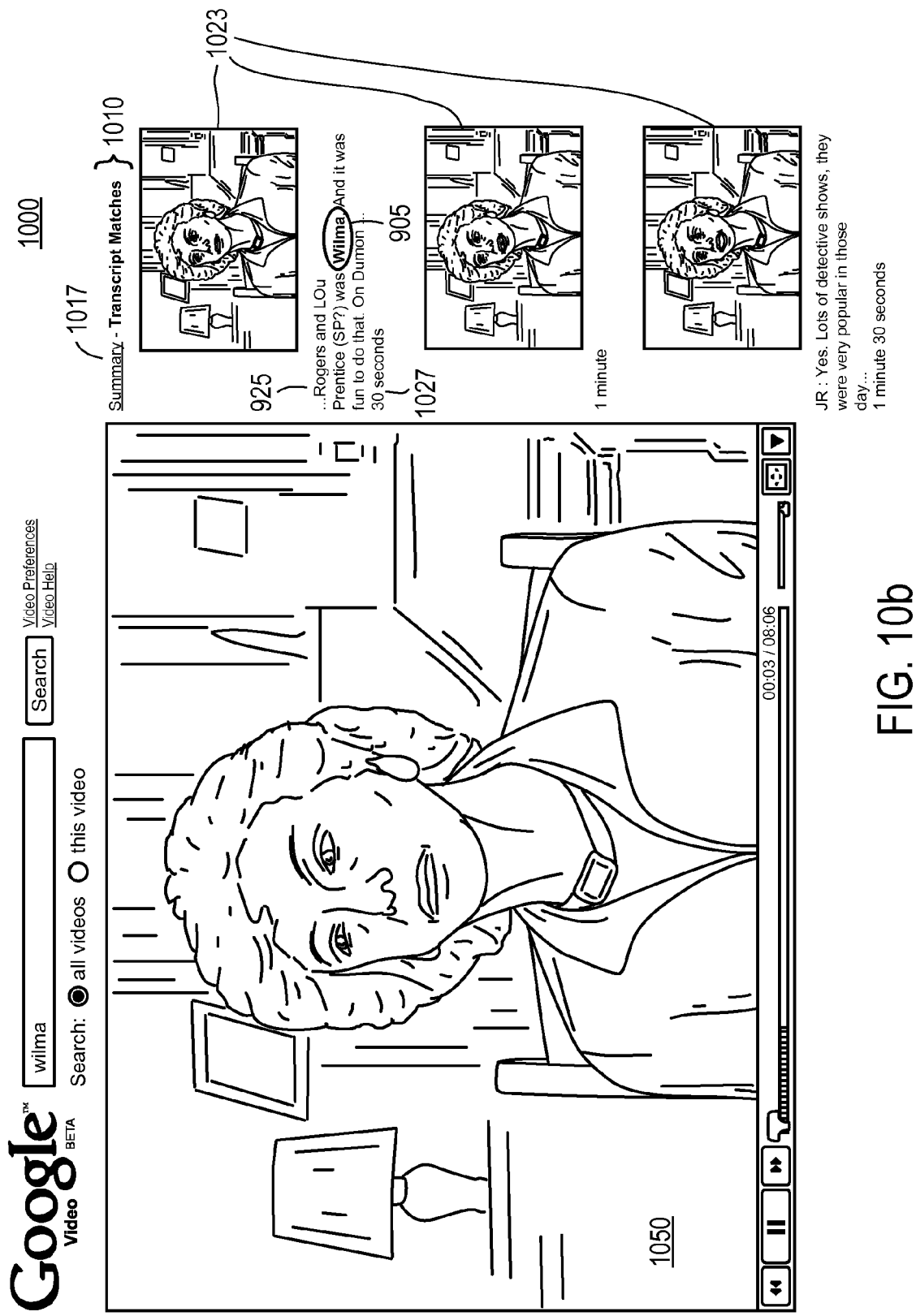

Clicking directly on a video display area or thumbnail 745 takes the user to a video article display page 1000, e.g., as shown in FIG. 10a. The video article display page 1000 displays a large video display area or screen 1050, for playing the video article, and includes additional functionality. The video article display page 1000 includes the elements for searching for video content 705-720 as described above. In addition, search designation radio buttons 1005 are added, allowing the user to further search the displayed video article or all video articles. In one embodiment, the video article display page 1000 has two different view formats, as indicated in the view format selection area 1010. The "summary" format is displayed in FIG. 10a. The user can switch to the "transcript matches" format by clicking the transcript matches button 1015; one embodiment of the "transcript matches" format is shown in FIG. 10b. The video article display page 1000 includes much of the same information about the video article as described in conjunction with earlier pages, such as the title 755, source 930 of the video article, date of original broadcast 935, video article length 760, and subtitle 920. In addition, photographer information 1030 is displayed if available.

The video article display page 1000 also includes a send video button 1020 and in some examples, a website button 1025. The send email button 1020, when clicked, takes the user to the send video page 1080, as described in conjunction with FIG. 10c. The website button 1025, if shown, links the user to the content provider's website.

In conjunction with the screen 1050, a series of buttons 1055-1075 are displayed for controlling the video article within the screen 1050. Buttons in on embodiment include a rewind button 1055, a pause button 1060, a fast forward button 1065, a slide bar 1070, and buttons for various other alterations of the video article and screen 1050. In one embodiment, the pause button 1060 acts as a toggle. Thus, when the video article is paused, it displays a triangle or play symbol. The slide bar 1070 allows the user to jump to a different portion of the video article.

Referring now to FIG. 10b, a video article display page 1000 in the "transcript matches" format is shown according to one embodiment. Note that the view format selection area 1010 now shows a "summary" format link 1017, which when clicked takes the user to the "summary" format page described in conjunction with FIG. 10a. Replacing the summary information beside the screen 1050, several segment thumbnails 1023 are displayed, corresponding to various time segments of the video article, for example 30 second increments in the depicted example. Under each segment thumbnail 1023 a portion of the text 925 is displayed, in which the query 905 is distinguished among the text 925. In addition, a segment length indicator 1027 shows the length of each segment thumbnail. Clicking on a segment thumbnail 1023 displays the video article from that segment forward.

Figure 10C:
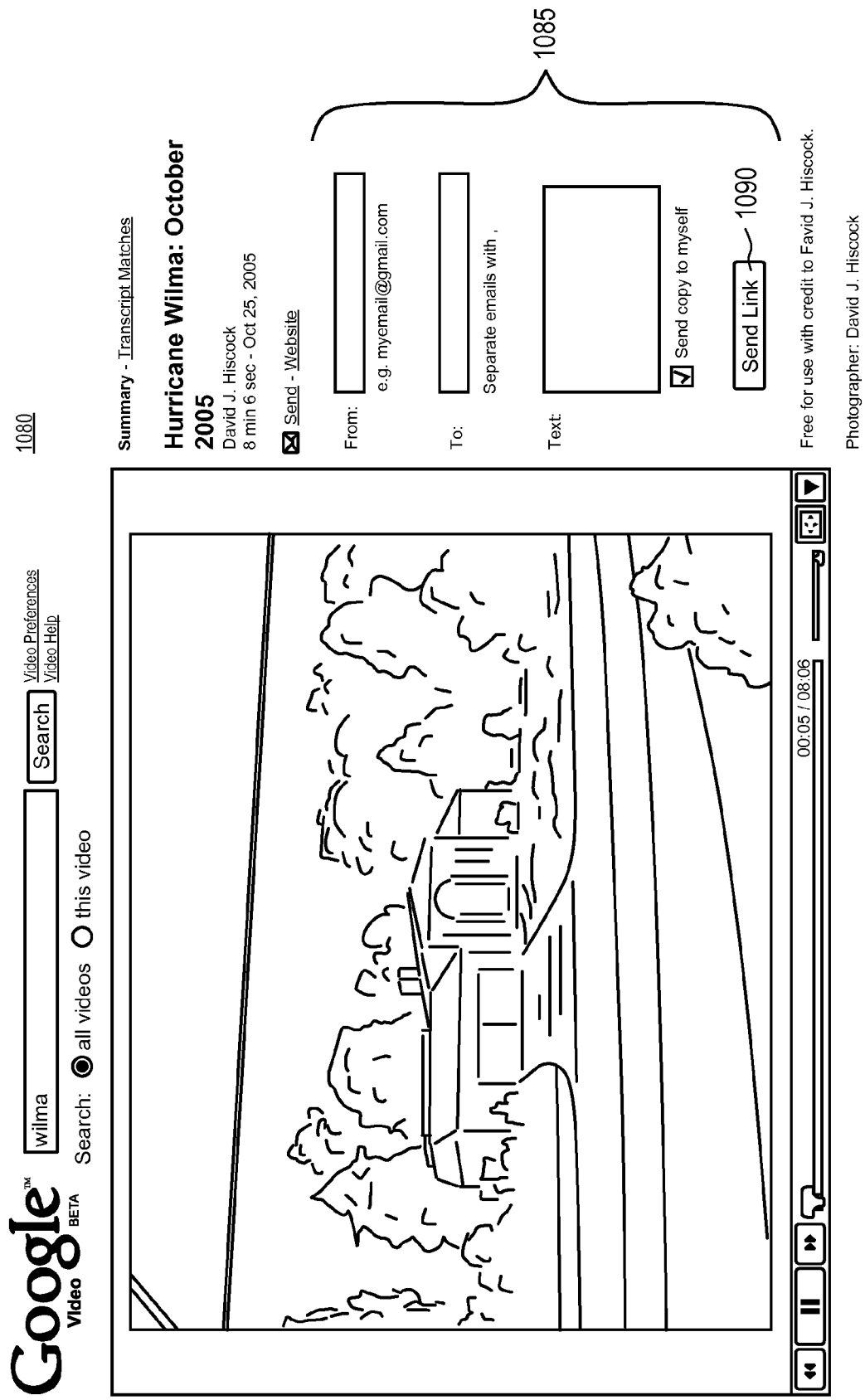
FIG. 10c is a send video page according to one embodiment of the present invention.

Referring now to FIG. 10c, one embodiment of a send video page 1080 is shown. The send video page 1080 includes an area 1085 for sending the video article by email, including for example fields for entering a "to" email address, a "from" email address, additional text to accompany the video article, and a box to select to send receive a copy of the email. Clicking on the send link 1090 sends the email and video article.

We claim:

1. A computer-implemented method of ranking a plurality of video articles, comprising:
   for each of the plurality of video articles, performing the following steps at a server:
      determining video-oriented characteristic data of a video article, the video-oriented characteristic data describing one or more characteristics of at least one broadcast of the video article, wherein each video article has metadata describing the video article; and
      determining a rank score based at least in part on the video article-oriented characteristic data and based at least in part on the metadata of the video article;
   determining an order for transmitting the plurality of video articles to a client, the order of transmission based on the rank score for each of the plurality of video articles.

2. The method of claim 1, wherein the video-oriented characteristic data is broadcast time period data of the video article, wherein the broadcast time period data describes when to broadcast the video article.

3. The method of claim 1, wherein the video-oriented characteristic data is rating data of the video article, wherein the rating data of the video article describes how the video article is rated based on a video rating criterion.

4. The method of claim 1, wherein the video-oriented characteristic data is third-party data of the video article, wherein the third-party data of the video article describes a cost estimation of the video article.

5. The method of claim 1, wherein the video-oriented characteristic data is user data of the video article, wherein the user data of the video article describes one or more user actions on the video article.

6. The method of claim 1, wherein the metadata of the video article is a name of the video article.

7. The method of claim 1, wherein the metadata of the video article is a subtitle of the video article.

8. The method of claim 1, wherein the metadata of the video article is a text associated with the video article.

9. A non-transitory computer-readable storage medium for ranking a plurality of video articles, the non-transitory computer-readable storage medium comprising computer-executable instructions encoded on the medium, comprising:
> for each of the plurality of video articles, performing the following steps at a server:
>> determining video-oriented characteristic data of a video article, the video-oriented characteristic data describing one or more characteristics of at least one broadcast of the video article, wherein each video article has metadata describing the video article; and
>> determining a rank score based at least in part on the video article-oriented characteristic data and based at least in part on the metadata of the video article;
> determining an order for transmitting the plurality of video articles to a client, the order of transmission based on the rank score for each of the plurality of video articles.

10. The computer-readable storage medium of claim 9, wherein the video-oriented characteristic data is broadcast time period data of the video article, wherein the broadcast time period data describes when to broadcast the video article.

11. The computer-readable storage medium of claim 9, wherein the video-oriented characteristic data is rating data of the video article, wherein the rating data of the video article describes how the video article is rated based on a video rating criterion.

12. The computer-readable storage medium of claim 9, wherein the video-oriented characteristic data is third-party data of the video article, wherein the third-party data of the video article describes a cost estimation of the video article.

13. The computer-readable storage medium of claim 9, wherein the video-oriented characteristic data is user data of the video article, wherein the user data of the video article describes one or more user actions on the video article.

14. The computer-readable storage medium of claim 9, wherein the metadata of the video article is a name of the video article.

15. The computer-readable storage medium of claim 9, wherein the metadata of the video article is a subtitle of the video article.

16. The computer-readable storage medium of claim 9, wherein the metadata of the video article is a text associated with the video article.

17. A system for ranking a plurality of video articles, the system comprising:
> means for, for each of the plurality of video articles, determining video-oriented characteristic data of a video article, the video-oriented characteristic data describing one or more characteristics of at least one broadcast of the video article, wherein each video article has metadata describing the video article;
> means for, for each of the plurality of video articles, determining a rank score based at least in part on the video article-oriented characteristic data and based at least in part on the metadata of the video article;
> means for determining an order for transmitting the plurality of video articles to a client, the order of transmission based on the rank score for each of the plurality of video articles.

18. The system of claim 17, wherein the video-oriented characteristic data is broadcast time period data of the video article, wherein the broadcast time period data describes when to broadcast the video article.

19. The system of claim 17, wherein the video-oriented characteristic data is rating data of the video article, wherein the rating data of the video article describes how the video article is rated based on a video rating criterion.

20. The system of claim 17, wherein the metadata of the video article is a name of the video article.

21. The system of claim 17, wherein the metadata of the video article is a subtitle of the video article.

* * * * *